US012075414B2

(12) United States Patent
Gauvreau et al.

(10) Patent No.: US 12,075,414 B2
(45) Date of Patent: Aug. 27, 2024

(54) CONTROLLER BASED CONTROL OVER WIRELESS DEVICE ASSOCIATION WITH WIRELESS ACCESS POINTS

(71) Applicant: NOKIA SOLUTIONS AND NETWORKS OY, Espoo (FI)

(72) Inventors: Jean-Louis Gauvreau, La Prairie (CA); Angelo Cuffaro, Laval (CA); Yuying Dai, Brossard (CA); Rajinikanthan P, Chennai (IN)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 351 days.

(21) Appl. No.: 17/563,463

(22) Filed: Dec. 28, 2021

(65) Prior Publication Data

US 2023/0209546 A1 Jun. 29, 2023

(51) Int. Cl.
*H04W 72/20* (2023.01)
*H04W 88/08* (2009.01)

(52) U.S. Cl.
CPC ............ *H04W 72/20* (2023.01); *H04W 88/08* (2013.01)

(58) Field of Classification Search
None
See application file for complete search history.

(56) References Cited

U.S. PATENT DOCUMENTS

| 9,258,726 | B2* | 2/2016 | Huang | H04W 48/16 |
| 10,687,276 | B2* | 6/2020 | Caldwell | H04W 12/08 |
| 11,310,106 | B2* | 4/2022 | Singla | H04W 12/06 |
| 11,895,551 | B2* | 2/2024 | Strater | H04W 36/0058 |
| 2008/0316982 | A1* | 12/2008 | Murty | H04W 48/02 370/338 |

(Continued)

FOREIGN PATENT DOCUMENTS

| EP | 2533573 A1 | 12/2012 |
| WO | 2013116564 A1 | 8/2013 |
| WO | 2015178757 A1 | 11/2015 |

OTHER PUBLICATIONS

EP Search Report mailed in corresponding EP Application No. 22209651.3 on Mar. 27, 2023, 11 pages.

(Continued)

*Primary Examiner* — Kodzovi Acolatse
(74) *Attorney, Agent, or Firm* — Tong, Rea, Bentley & Kim, LLC

(57) ABSTRACT

Various example embodiments for supporting control over association of WiFi clients with WiFi access points are presented herein. Various example embodiments for supporting control over association of WiFi clients with WiFi access points may be configured to support control over association of WiFi clients with WiFi access points and radio bands of WiFi access points. Various example embodiments for supporting control over association of WiFi clients with WiFi access points and radio bands of WiFi access points may be configured to control association of WiFi clients with WiFi access points and radio bands of WiFi access points by refusing requests of WiFi clients (e.g., authentication requests, association requests, or the like), including sub-optimal requests of WiFi clients, based on WiFi access control information maintained on the WiFi access points.

22 Claims, 8 Drawing Sheets

(56) References Cited

U.S. PATENT DOCUMENTS

| | | | |
|---|---|---|---|
| 2010/0293250 A1* | 11/2010 | Ankaiah | H04W 12/088 |
| | | | 709/227 |
| 2011/0223912 A1* | 9/2011 | Nasielski | H04W 12/08 |
| | | | 455/435.1 |
| 2012/0243474 A1* | 9/2012 | Iyer | H04L 63/1466 |
| | | | 370/328 |
| 2012/0322481 A1 | 12/2012 | Laroche | |
| 2016/0029248 A1 | 1/2016 | Syed | |
| 2017/0272317 A1* | 9/2017 | Singla | H04L 41/16 |
| 2018/0352497 A1 | 12/2018 | Taskin et al. | |
| 2019/0082360 A1* | 3/2019 | Henry | H04L 47/2475 |
| 2019/0297546 A1 | 9/2019 | Likar et al. | |
| 2020/0154328 A1 | 5/2020 | Strater | |
| 2020/0322216 A1 | 10/2020 | Singla | |
| 2021/0105639 A1* | 4/2021 | McFarland | H04L 5/0032 |
| 2021/0289506 A1 | 9/2021 | Puranik | |
| 2021/0297875 A1 | 9/2021 | Erger | |
| 2022/0086640 A1* | 3/2022 | Sacher | H04W 48/04 |
| 2022/0201594 A1 | 6/2022 | Gwey | |
| 2022/0345991 A1* | 10/2022 | Changlani | H04W 48/10 |
| 2023/0010677 A1* | 1/2023 | Liang | H04W 12/50 |
| 2023/0403751 A1* | 12/2023 | Patwardhan | H04W 48/16 |

OTHER PUBLICATIONS

Saldana J., et al., "Unsticking the WiFi Client: Smarter Decisions Using a Software Defined Wireless Solution," IEEE Access, vol. 6, Jun. 2018, 15 pages.

* cited by examiner

CONTROLLER BASED CONTROL OVER WIRELESS DEVICE ASSOCIATION WITH WIRELESS ACCESS POINTS

TECHNICAL FIELD

Various example embodiments relate generally to communication systems and, more particularly but not exclusively, to association of wireless devices with wireless access points.

BACKGROUND

In communication systems, various communications technologies may be used to support various types of communications.

SUMMARY

In at least some example embodiments, an apparatus includes at least one processor and at least one memory including computer program code, wherein the at least one memory and the computer program code are configured to, with the at least one processor, cause the apparatus to at least send, by a wireless access point configured to support communications using a first wireless band and a second wireless band and toward a controller, feedback information related to association of wireless devices with the wireless access point and receive, by the wireless access point from the controller, wireless access control information associated with the first wireless band of the wireless access point and configured to control association of wireless devices with the first wireless band of the wireless access point. In at least some example embodiments, the feedback information includes performance data including channel status information for a wireless device associated with the wireless access point. In at least some example embodiments, the channel status information for the wireless device associated with the wireless access point includes received signal strength indicator data of the wireless device. In at least some example embodiments, the feedback information includes performance data including radio band performance information associated with at least one of the first wireless band or the second wireless band. In at least some example embodiments, the wireless access control information includes an access control list identifying a set of wireless devices to be blocked from associating with the first wireless band. In at least some example embodiments, the at least one memory and the computer program code are configured to, with the at least one processor, cause the apparatus to at least receive, by the wireless access point from the controller, an indication that the wireless access control information is to be enabled at the wireless access point and enable, by the wireless access point based on the indication, the wireless access control information. In at least some example embodiments, the at least one memory and the computer program code are configured to, with the at least one processor, cause the apparatus to at least receive, by the wireless access point from the controller, an indication that the wireless access control information is to be disabled at the wireless access point and disable, by the wireless access point based on the indication, the wireless access control information. In at least some example embodiments, the at least one memory and the computer program code are configured to, with the at least one processor, cause the apparatus to at least monitor, by the wireless access point, a signal strength level of a wireless device for the second radio band and modify, by the wireless access point based on the signal strength level of the wireless device for the second radio band, the wireless access control information. In at least some example embodiments, an indication of the wireless device is removed from the wireless access control information when the wireless device is associated with the second radio band and the signal strength level of the wireless device is less than or equal to a signal strength threshold. In at least some example embodiments, an indication of the wireless device is added to the wireless access control information when the wireless device is associated with the second radio band and the signal strength level of the wireless device is greater than or equal to a signal strength threshold. In at least some example embodiments, the at least one memory and the computer program code are configured to, with the at least one processor, cause the apparatus to at least maintain, by the wireless access point for a wireless device identified in the wireless access control information, an inactivity timer and update, by the wireless access point based on the inactivity timer, the wireless access control information to remove an indication of the wireless device from the wireless access control information. In at least some example embodiments, the at least one memory and the computer program code are configured to, with the at least one processor, cause the apparatus to at least receive, by the wireless access point, a request of a wireless device to communication using the first wireless band and prevent, by the wireless access point based on the wireless access control information associated with the first wireless band, association of the wireless device with the first wireless band. In at least some example embodiments, the first wireless band is at a lower frequency than the second wireless band. In at least some example embodiments, the first wireless band includes a 2.4 GHz band and the second wireless band includes a 5 GHz band or a 6 GHz band.

In at least some example embodiments, a non-transitory computer-readable medium stores computer program code configured to cause an apparatus to send, by a wireless access point configured to support communications using a first wireless band and a second wireless band and toward a controller, feedback information related to association of wireless devices with the wireless access point and receive, by the wireless access point from the controller, wireless access control information associated with the first wireless band of the wireless access point and configured to control association of wireless devices with the first wireless band of the wireless access point. In at least some example embodiments, the feedback information includes performance data including channel status information for a wireless device associated with the wireless access point. In at least some example embodiments, the channel status information for the wireless device associated with the wireless access point includes received signal strength indicator data of the wireless device. In at least some example embodiments, the feedback information includes performance data including radio band performance information associated with at least one of the first wireless band or the second wireless band. In at least some example embodiments, the wireless access control information includes an access control list identifying a set of wireless devices to be blocked from associating with the first wireless band. In at least some example embodiments, the computer program code is configured to cause the apparatus to at least receive, by the wireless access point from the controller, an indication that the wireless access control information is to be enabled at the wireless access point and enable, by the wireless access point based on the indication, the wireless access control information. In at least some example embodiments, the computer program code is configured to cause the apparatus to at least receive, by the wireless access point from the controller, an indication that the wireless access control information is to be disabled at the wireless access point and disable, by the wireless access point based on the indication, the wireless access control information. In at least some example embodiments, the computer program code is configured to cause the apparatus to at least monitor, by the wireless access point, a signal strength level of a wireless device for the second radio band and modify, by the wireless access point based on the signal strength level of the wireless device for the second radio band, the wireless access control information. In at least some example embodiments, an indication of the wireless device is removed from the wireless access control information when the wireless device is associated with the second radio band and the signal strength level of the wireless device is less than or equal to a signal strength threshold. In at least some example embodiments, an indication of the wireless device is added to the wireless access control information when the wireless device is associated with the second radio band and the signal strength level of the wireless device is greater than or equal to a signal strength threshold. In at least some example embodiments, the computer program code is configured to cause the apparatus to at least maintain, by the wireless access point for a wireless device identified in the wireless access control information, an inactivity timer and update, by the wireless access point based on the inactivity timer, the wireless access control information to remove an indication of the wireless device from the wireless access control information. In at least some example embodiments, the computer program code is configured to cause the apparatus to at least receive, by the wireless access point, a request of a wireless device to communication using the first wireless band and prevent, by the wireless access point based on the wireless access control information associated with the first wireless band, association of the wireless device with the first wireless band. In at least some example embodiments, the first wireless band is at a lower frequency than the second wireless band. In at least some example embodiments, the first wireless band includes a 2.4 GHz band and the second wireless band includes a 5 GHz band or a 6 GHz band.

In at least some example embodiments, a method includes sending, by a wireless access point configured to support communications using a first wireless band and a second wireless band and toward a controller, feedback information related to association of wireless devices with the wireless access point and receiving, by the wireless access point from the controller, wireless access control information associated with the first wireless band of the wireless access point and configured to control association of wireless devices with the first wireless band of the wireless access point. In at least some example embodiments, the feedback information includes performance data including channel status information for a wireless device associated with the wireless access point. In at least some example embodiments, the channel status information for the wireless device associated with the wireless access point includes received signal strength indicator data of the wireless device. In at least some example embodiments, the feedback information includes performance data including radio band performance information associated with at least one of the first wireless band or the second wireless band. In at least some example embodiments, the wireless access control information includes an access control list identifying a set of wireless devices to be blocked from associating with the first wireless band. In at least some example embodiments, the method includes receiving, by the wireless access point from the controller, an indication that the wireless access control information is to be enabled at the wireless access point and enabling, by the wireless access point based on the indication, the wireless access control information. In at least some example embodiments, the method includes receiving, by the wireless access point from the controller, an indication that the wireless access control information is to be disabled at the wireless access point and disabling, by the wireless access point based on the indication, the wireless access control information. In at least some example embodiments, the method includes monitoring, by the wireless access point, a signal strength level of a wireless device for the second radio band and modifying, by the wireless access point based on the signal strength level of the wireless device for the second radio band, the wireless access control information. In at least some example embodiments, an indication of the wireless device is removed from the wireless access control information when the wireless device is associated with the second radio band and the signal strength level of the wireless device is less than or equal to a signal strength threshold. In at least some example embodiments, an indication of the wireless device is added to the wireless access control information when the wireless device is associated with the second radio band and the signal strength level of the wireless device is greater than or equal to a signal strength threshold. In at least some example embodiments, the method includes maintaining, by the wireless access point for a wireless device identified in the wireless access control information, an inactivity timer and updating, by the wireless access point based on the inactivity timer, the wireless access control information to remove an indication of the wireless device from the wireless access control information. In at least some example embodiments, the method includes receiving, by the wireless access point, a request of a wireless device to communication using the first wireless band and preventing, by the wireless access point based on the wireless access control information associated with the first wireless band, association of the wireless device with the first wireless band. In at least some example embodiments, the first wireless band is at a lower frequency than the second wireless band. In at least some example embodiments, the first wireless band includes a 2.4 GHz band and the second wireless band includes a 5 GHz band or a 6 GHz band.

In at least some example embodiments, an apparatus includes means for sending, by a wireless access point configured to support communications using a first wireless band and a second wireless band and toward a controller, feedback information related to association of wireless devices with the wireless access point and means for receiving, by the wireless access point from the controller, wireless access control information associated with the first wireless band of the wireless access point and configured to control association of wireless devices with the first wireless band of the wireless access point. In at least some example embodiments, the feedback information includes performance data including channel status information for a wireless device associated with the wireless access point. In at least some example embodiments, the channel status information for the wireless device associated with the wireless access point includes received signal strength indicator data of the wireless device. In at least some example embodiments, the feedback information includes performance data including radio band performance information associated with at least one of the first wireless band or the second wireless band. In at least some example embodiments, the wireless access control information includes an access control list identifying a set of wireless devices to be blocked from associating with the first wireless band. In at least some example embodiments, the apparatus includes means for receiving, by the wireless access point from the controller, an indication that the wireless access control information is to be enabled at the wireless access point and means for enabling, by the wireless access point based on the indication, the wireless access control information. In at least some example embodiments, the apparatus includes means for receiving, by the wireless access point from the controller, an indication that the wireless access control information is to be disabled at the wireless access point and means for disabling, by the wireless access point based on the indication, the wireless access control information. In at least some example embodiments, the apparatus includes means for monitoring, by the wireless access point, a signal strength level of a wireless device for the second radio band and means for modifying, by the wireless access point based on the signal strength level of the wireless device for the second radio band, the wireless access control information. In at least some example embodiments, an indication of the wireless device is removed from the wireless access control information when the wireless device is associated with the second radio band and the signal strength level of the wireless device is less than or equal to a signal strength threshold. In at least some example embodiments, an indication of the wireless device is added to the wireless access control information when the wireless device is associated with the second radio band and the signal strength level of the wireless device is greater than or equal to a signal strength threshold. In at least some example embodiments, the apparatus includes means for maintaining, by the wireless access point for a wireless device identified in the wireless access control information, an inactivity timer and means for updating, by the wireless access point based on the inactivity timer, the wireless access control information to remove an indication of the wireless device from the wireless access control information. In at least some example embodiments, the apparatus includes means for receiving, by the wireless access point, a request of a wireless device to communication using the first wireless band and means for preventing, by the wireless access point based on the wireless access control information associated with the first wireless band, association of the wireless device with the first wireless band. In at least some example embodiments, the first wireless band is at a lower frequency than the second wireless band. In at least some example embodiments, the first wireless band includes a 2.4 GHz band and the second wireless band includes a 5 GHz band or a 6 GHz band.

In at least some example embodiments, an apparatus includes at least one processor and at least one memory including computer program code, wherein the at least one memory and the computer program code are configured to, with the at least one processor, cause the apparatus to at least determine, by a controller for a wireless access point configured to support a first wireless band and a second wireless band, wireless access control information associated with the first wireless band of the wireless access point and configured to control association of wireless devices with the first wireless band of the wireless access point and send, by the controller toward the wireless access point, the wireless access control information. In at least some example embodiments, the wireless access control information includes an access control list identifying a set of wireless devices to be blocked from associating with the first wireless band. In at least some example embodiments, the wireless access control information is determined based on performance data received from the wireless access point. In at least some example embodiments, the performance data includes channel status information associated with one or more wireless devices associated with the wireless access point. In at least some example embodiments, the performance data includes radio band performance information associated with at least one of the first wireless band or the second wireless band. In at least some example embodiments, the wireless access control information is determined based on device capability information for one or more wireless devices associated with the wireless access point. In at least some example embodiments, the at least one memory and the computer program code are configured to, with the at least one processor, cause the apparatus to at least send, by the controller toward the wireless access point based on a congestion state of the second wireless band, an instruction for changing an activation state of the wireless access control information for the first wireless band on the wireless access point. In at least some example embodiments, the instruction is configured to change the activation state of the access control information from being enabled to being disabled based on the congestion state of the second wireless band changing from an indication that the second wireless band is uncongested to an indication that the second wireless band is congested. In at least some example embodiments, the instruction is configured to change the activation state of the access control information from being disabled to being enabled based on the congestion state of the second wireless band changing from an indication that the second wireless band is congested to an indication that the second wireless band is uncongested. In at least some example embodiments, the at least one memory and the computer program code are configured to, with the at least one processor, cause the apparatus to at least monitor, by the controller, a signal strength level of a wireless device for the second radio band and modify, by the controller based on the signal strength level of the wireless device for the second radio band, the wireless access control information. In at least some example embodiments, an indication of the wireless device is removed from the wireless access control information when the wireless device is associated with the second radio band and the signal strength level of the wireless device is less than or equal to a signal strength threshold. In at least some example embodiments, an indication of the wireless device is added to the wireless access control information when the wireless device is associated with the second radio band and the signal strength level of the wireless device is greater than or equal to a signal strength threshold. In at least some example embodiments, the at least one memory and the computer program code are configured to, with the at least one processor, cause the apparatus to at least maintain, by the controller for a wireless device identified in the wireless access control information, an inactivity timer and send, by the controller toward the wireless access point based on the inactivity timer, a message including an indication that the wireless device is to be removed from the wireless access control information. In at least some example embodiments, the first wireless band is at a lower frequency than the second wireless band. In at least some example embodiments, the first wireless band includes a 2.4 GHz band and the second wireless band includes a 5 GHz band or a 6 GHz band.

In at least some example embodiments, a non-transitory computer-readable medium stores computer program code configured to cause an apparatus to determine, by a controller for a wireless access point configured to support a first wireless band and a second wireless band, wireless access control information associated with the first wireless band of the wireless access point and configured to control association of wireless devices with the first wireless band of the wireless access point and send, by the controller toward the wireless access point, the wireless access control information. In at least some example embodiments, the wireless access control information includes an access control list identifying a set of wireless devices to be blocked from associating with the first wireless band. In at least some example embodiments, the wireless access control information is determined based on performance data received from the wireless access point. In at least some example embodiments, the performance data includes channel status information associated with one or more wireless devices associated with the wireless access point. In at least some example embodiments, the performance data includes radio band performance information associated with at least one of the first wireless band or the second wireless band. In at least some example embodiments, the wireless access control information is determined based on device capability information for one or more wireless devices associated with the wireless access point. In at least some example embodiments, the computer program code is configured to cause the apparatus to at least send, by the controller toward the wireless access point based on a congestion state of the second wireless band, an instruction for changing an activation state of the wireless access control information for the first wireless band on the wireless access point. In at least some example embodiments, the instruction is configured to change the activation state of the access control information from being enabled to being disabled based on the congestion state of the second wireless band changing from an indication that the second wireless band is uncongested to an indication that the second wireless band is congested. In at least some example embodiments, the instruction is configured to change the activation state of the access control information from being disabled to being enabled based on the congestion state of the second wireless band changing from an indication that the second wireless band is congested to an indication that the second wireless band is uncongested. In at least some example embodiments, the computer program code is configured to cause the apparatus to at least monitor, by the controller, a signal strength level of a wireless device for the second radio band and modify, by the controller based on the signal strength level of the wireless device for the second radio band, the wireless access control information. In at least some example embodiments, an indication of the wireless device is removed from the wireless access control information when the wireless device is associated with the second radio band and the signal strength level of the wireless device is less than or equal to a signal strength threshold. In at least some example embodiments, an indication of the wireless device is added to the wireless access control information when the wireless device is associated with the second radio band and the signal strength level of the wireless device is greater than or equal to a signal strength threshold. In at least some example embodiments, the computer program code is configured to cause the apparatus to at least maintain, by the controller for a wireless device identified in the wireless access control information, an inactivity timer and send, by the controller toward the wireless access point based on the inactivity timer, a message including an indication that the wireless device is to be removed from the wireless access control information. In at least some example embodiments, the first wireless band is at a lower frequency than the second wireless band. In at least some example embodiments, the first wireless band includes a 2.4 GHz band and the second wireless band includes a 5 GHz band or a 6 GHz band.

In at least some example embodiments, a method includes determining, by a controller for a wireless access point configured to support a first wireless band and a second wireless band, wireless access control information associated with the first wireless band of the wireless access point and configured to control association of wireless devices with the first wireless band of the wireless access point and sending, by the controller toward the wireless access point, the wireless access control information. In at least some example embodiments, the wireless access control information includes an access control list identifying a set of wireless devices to be blocked from associating with the first wireless band. In at least some example embodiments, the wireless access control information is determined based on performance data received from the wireless access point. In at least some example embodiments, the performance data includes channel status information associated with one or more wireless devices associated with the wireless access point. In at least some example embodiments, the performance data includes radio band performance information associated with at least one of the first wireless band or the second wireless band. In at least some example embodiments, the wireless access control information is determined based on device capability information for one or more wireless devices associated with the wireless access point. In at least some example embodiments, the method includes sending, by the controller toward the wireless access point based on a congestion state of the second wireless band, an instruction for changing an activation state of the wireless access control information for the first wireless band on the wireless access point. In at least some example embodiments, the instruction is configured to change the activation state of the access control information from being enabled to being disabled based on the congestion state of the second wireless band changing from an indication that the second wireless band is uncongested to an indication that the second wireless band is congested. In at least some example embodiments, the instruction is configured to change the activation state of the access control information from being disabled to being enabled based on the congestion state of the second wireless band changing from an indication that the second wireless band is congested to an indication that the second wireless band is uncongested. In at least some example embodiments, the method includes monitoring, by the controller, a signal strength level of a wireless device for the second radio band and modifying, by the controller based on the signal strength level of the wireless device for the second radio band, the wireless access control information. In at least some example embodiments, an indication of the wireless device is removed from the wireless access control information when the wireless device is associated with the second radio band and the signal strength level of the wireless device is less than or equal to a signal strength threshold. In at least some example embodiments, an indication of the wireless device is added to the wireless access control information when the wireless device is associated with the second radio band and the signal strength level of the wireless device is greater than or equal to a signal strength threshold. In at least some example embodiments, the method includes maintaining, by the controller for a wireless device identified in the wireless access control information, an inactivity timer and sending, by the controller toward the wireless access point based on the inactivity timer, a message including an indication that the wireless device is to be removed from the wireless access control information. In at least some example embodiments, the first wireless band is at a lower frequency than the second wireless band. In at least some example embodiments, the first wireless band includes a 2.4 GHz band and the second wireless band includes a 5 GHz band or a 6 GHz band.

In at least some example embodiments, an apparatus includes means for determining, by a controller for a wireless access point configured to support a first wireless band and a second wireless band, wireless access control information associated with the first wireless band of the wireless access point and configured to control association of wireless devices with the first wireless band of the wireless access point and means for sending, by the controller toward the wireless access point, the wireless access control information. In at least some example embodiments, the wireless access control information includes an access control list identifying a set of wireless devices to be blocked from associating with the first wireless band. In at least some example embodiments, the wireless access control information is determined based on performance data received from the wireless access point. In at least some example embodiments, the performance data includes channel status information associated with one or more wireless devices associated with the wireless access point. In at least some example embodiments, the performance data includes radio band performance information associated with at least one of the first wireless band or the second wireless band. In at least some example embodiments, the wireless access control information is determined based on device capability information for one or more wireless devices associated with the wireless access point. In at least some example embodiments, the apparatus includes means for sending, by the controller toward the wireless access point based on a congestion state of the second wireless band, an instruction for changing an activation state of the wireless access control information for the first wireless band on the wireless access point. In at least some example embodiments, the instruction is configured to change the activation state of the access control information from being enabled to being disabled based on the congestion state of the second wireless band changing from an indication that the second wireless band is uncongested to an indication that the second wireless band is congested. In at least some example embodiments, the instruction is configured to change the activation state of the access control information from being disabled to being enabled based on the congestion state of the second wireless band changing from an indication that the second wireless band is congested to an indication that the second wireless band is uncongested. In at least some example embodiments, the apparatus includes means for monitoring, by the controller, a signal strength level of a wireless device for the second radio band and means for modifying, by the controller based on the signal strength level of the wireless device for the second radio band, the wireless access control information. In at least some example embodiments, an indication of the wireless device is removed from the wireless access control information when the wireless device is associated with the second radio band and the signal strength level of the wireless device is less than or equal to a signal strength threshold. In at least some example embodiments, an indication of the wireless device is added to the wireless access control information when the wireless device is associated with the second radio band and the signal strength level of the wireless device is greater than or equal to a signal strength threshold. In at least some example embodiments, the apparatus includes means for maintaining, by the controller for a wireless device identified in the wireless access control information, an inactivity timer and sending, by the controller toward the wireless access point based on the inactivity timer, a message including an indication that the wireless device is to be removed from the wireless access control information. In at least some example embodiments, the first wireless band is at a lower frequency than the second wireless band. In at least some example embodiments, the first wireless band includes a 2.4 GHz band and the second wireless band includes a 5 GHz band or a 6 GHz band.

BRIEF DESCRIPTION OF THE DRAWINGS

The teachings herein can be readily understood by considering the following detailed description in conjunction with the accompanying drawings, in which.

To facilitate understanding, identical reference numerals have been used herein, wherever possible, in order to designate identical elements that are common among the various figures.

DETAILED DESCRIPTION

Figure 1:
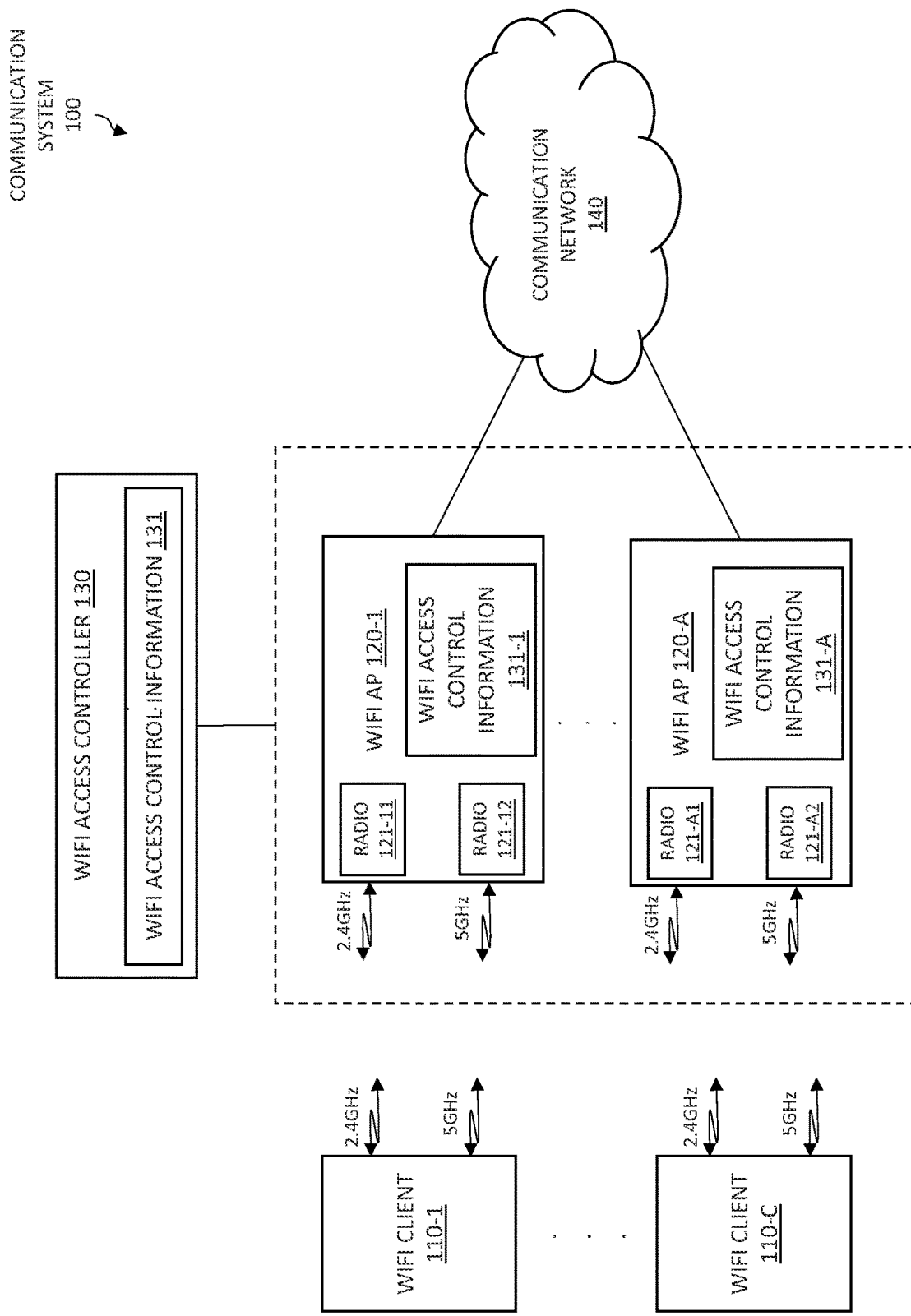
FIG. 1 depicts an example embodiment of a communication system including WiFi access points, WiFi clients, and a WiFi access controller configured to control association of the WiFi clients with the WiFi access points.

Various example embodiments for supporting control over association of WiFi clients with WiFi access points are presented herein. Various example embodiments for supporting control over association of WiFi clients with WiFi access points may be configured to support control over association of WiFi clients with WiFi access points and radio bands of WiFi access points. Various example embodiments for supporting control over association of WiFi clients with WiFi access points and radio bands of WiFi access points may be configured to control association of WiFi clients with WiFi access points and radio bands of WiFi access points by refusing requests of WiFi clients (e.g., authentication requests, association requests, or the like). Various example embodiments for supporting control over association of WiFi clients with WiFi access points and radio bands of WiFi access points may be configured to control association of WiFi clients with WiFi access points and radio bands of WiFi access points by refusing sub-optimal association requests of WiFi clients. Various example embodiments for supporting control over association of WiFi clients with WiFi access points and radio bands of WiFi access points may be configured to control association of WiFi clients with WiFi access points and radio bands of WiFi access points by refusing association requests of WiFi clients based on WiFi access control information maintained on the WiFi access points. Various example embodiments for supporting control over association of WiFi clients with WiFi access points and radio bands of WiFi access points may be configured to control association of WiFi clients with WiFi access points and radio bands of WiFi access points by refusing association requests of WiFi clients based on WiFi access control information in the form of Access Control Lists (ACLs) maintained on the WiFi access points. Various example embodiments for supporting control over association of WiFi clients with WiFi access points and radio bands of WiFi access points may be configured to control association of WiFi clients with WiFi access points and radio bands of WiFi access points by provisioning of ACLs on the WiFi access points to guide acceptance and refusal of association requests of WiFi clients in a manner tending to steer the WiFi clients to particular WiFi access points and particular radio bands of WiFi access points. Various example embodiments for supporting control over association of WiFi clients with WiFi access points and radio bands of WiFi access points may be configured to support control over association of WiFi clients with WiFi access points and radio bands of WiFi access points based on use of a WiFi access controller configured to manage control over access by WiFi clients to WiFi access points and radio bands of WiFi access points by receiving information from the WiFi access points (e.g., capability information, performance information, or the like, as well as various combinations thereof) and providing WiFi access point access control information (e.g., ACLs, steering commands, or the like, as well as various combinations thereof) to the WiFi access points for use by the WiFi access points to control the access by WiFi clients to the WiFi access points and radio bands of WiFi access points.

Various example embodiments for supporting control over association of WiFi clients with WiFi access points and radio bands of WiFi access points may be configured to control association of WiFi clients with WiFi access points and radio bands of WiFi access points in various ways. Various example embodiments for supporting control over access by WiFi clients to WiFi access points and radio bands may be configured to enable WiFi networks to force WiFi clients to associate with particular WiFi APs or radio bands of WiFi APs without requiring use of commands from the WiFi APs to the WiFi clients, thereby supporting control over association of WiFi clients with WiFi APs while still enabling the WiFi clients to autonomously select WiFi APs with which to associate. Various example embodiments for supporting control over access by WiFi clients to WiFi access points and radio bands may be configured to support centralized control over access by WiFi clients to WiFi access points and radio bands of WiFi access points, such as where a WiFi access controller determines the WiFi access control information and provides the WiFi access control information to the WiFi access points for use in controlling association by WiFi clients to WiFi access points and radio bands of WiFi access points, and the WiFi access controller also performs monitoring functions for modifying the WiFi access control information based on monitoring of WiFi clients (e.g., various information collected by the WiFi access points is provided by the WiFi access points to the WiFi access controller for use by the WiFi access controller in modifying the WiFi access control information of the WiFi access points). Various example embodiments for supporting control over access by WiFi clients to WiFi access points and radio bands of WiFi access points may be configured to support localized control over access by WiFi clients to WiFi access points and radio bands of WiFi access points, such as where the WiFi access controller determines the WiFi access control information and provides the WiFi access control information to the WiFi access points for use in controlling association by WiFi clients to WiFi access points and radio bands of WiFi access points, and the WiFi access points perform at least some monitoring functions for modifying the WiFi access control information based on monitoring of WiFi clients (e.g., various information collected by the WiFi access points is used by the WiFi access points to modify the WiFi access control information of the WiFi access points). Various example embodiments for supporting control over access by WiFi clients to WiFi access points and radio bands may be configured to use a cloud instance to implement the WiFi access controller that supports control over access by WiFi clients to WiFi access points and radio bands.

Various example embodiments for supporting control over association of WiFi clients with WiFi access points and radio bands of WiFi access points may be configured to control association of WiFi clients with WiFi access points and radio bands of WiFi access points while supporting various features related to controlling association of WiFi clients with WiFi access points and radio bands of WiFi access points. Various example embodiments for supporting control over access by WiFi clients to WiFi access points and radio bands may be configured to identify WiFi clients that prefer a particular radio band (e.g., the 2.4 GHz band or any other suitable radio band, which may be different for different WiFi clients) and remove those clients from the ACL for that radio band either permanently or for a pre-determined time to enable the WiFi clients to associate with that particular radio band. Various example embodiments for supporting control over access by WiFi clients to WiFi access points and radio bands may be configured to support dynamic monitoring of client RSSI levels and client capabilities of WiFi clients in order to intelligently add and remove WiFi clients from ACLs with the goal of steering WiFi clients to particular radio bands (e.g., the 5 GHz or 6 GHz radio band) while at the same time making sure that the performance of the WiFi clients on the particular radio bands (e.g., on the 5 GHz or 6 GHz band) is acceptable. Various example embodiments for supporting control over access by WiFi clients to WiFi access points and radio bands may be configured to provide intelligence to address the "garage" scenario by removing the client from 2.4 GHz ACL if the WiFi client is disconnected from the WiFi AP for a pre-defined time interval. Various example embodiments for supporting control over access by WiFi clients to WiFi access points and radio bands may be configured to support load balancing, such as by balancing the load across multiple radio bands of one or more WiFi APs by adding WiFi clients to the ACLs of the congested radio bands and steering those WiFi clients to the less congested radio bands, balancing the load across multiple WiFi APs by adding WiFi clients to the ACLs of the congested WiFi AP(s) and steering those WiFi clients to the less congested WiFi AP(s), or the like, as well as various combinations thereof.

It will be appreciated that these and various other example embodiments and advantages or potential advantages of supporting control over association of WiFi clients with WiFi access points may be further understood by way of reference to the various figures, which are discussed further below.

FIG. 1 depicts an example embodiment of a communication system including WiFi access points, WiFi clients, and a controller configured to control association of the WiFi clients with the WiFi access points.

The communication system 100 includes a set of WiFi clients 110-1 to 110-C (collectively, WiFi clients 110), a set of WiFi access points (APs) 120-1 to 120-A (collectively, WiFi APs 120), a WiFi access controller 130, and a communication network 140. The WiFi clients 110 may associate with the WiFi APs 120, based on WiFi access control functions supported by the WiFi access controller 130, to obtain network access to the communication network 140. The communication network 140 accessed by the WiFi clients 110 via the WiFi APs 120 may include any communications network(s) which may be utilized by WiFi clients 110, such as public communication networks, private communication networks, or the like, as well as various combinations thereof (e.g., Internet-related networks, enterprise networks, data center networks, or the like, as well as various combinations thereof).

The WiFi clients 110 include any devices which may associate with the WiFi APs 120 to obtain network access to the communication network 140. The WiFi clients 110 may support various IEEE 802.11 standards, such as one or more of 802.11 (WiFi 0, 2.4 GHz), 802.11b (WiFi 1, 2.4 GHz), 802.11a (WiFi 2, 5 GHz), 802.11g (WiFi 3, 5 GHz), 802.11n (WiFi 4, 2.4/5 GHz), 802.11ac (WiFi 5, 5 GHz), 802.11ax (WiFi 6, 2.4/5 GHz), 802.11b (WiFi 1, 2.4 GHz), or the like. The WiFi clients 110 may support one or more WiFi radio bands (e.g., single-band, dual-band, tri-band, and so forth) which may be used by the WiFi clients 110 for communication with the WiFi APs 120 (e.g., one or more of 2.4 GHz, 5 GHz, 6 GHz, or the like). In the example of FIG. 1 for purposes of clarity, each of the WiFi clients 110 is depicted as a dual-band device supporting the 2.4 GHz band and the 5 GHz band; however, it will be appreciated that WiFi clients 110 may include single-band devices (e.g., supporting only one of 2.4 GHz, 5 GHz, 6 GHz, or the like), multi-band devices supporting other numbers or combinations of WiFi radio bands, or the like, as well as various combinations thereof. For example, the WiFi clients 110 may include computers, smartphones, televisions, home control devices, appliances, Internet-of-Things (IoT) devices, and so forth.

The WiFi APs 120 are configured to support communications of the WiFi clients 110 via the communication network 140. The WiFi APs 120 may support various IEEE standards, such as one or more of 802.11 (WiFi 0, 2.4 GHz), 802.11b (WiFi 1, 2.4 GHz), 802.11a (WiFi 2, 5 GHz), 802.11g (WiFi 3, 5 GHz), 802.11n (WiFi 4, 2.4/5 GHz), 802.11ac (WiFi 5, 5 GHz), 802.11ax (WiFi 6, 2.4/5 GHz), 802.11b (WiFi 1, 2.4 GHz), or the like. The WiFi APs 120 may support one or more WiFi radio bands which may be used by the WiFi clients 110 for communication with the WiFi APs 120 (e.g., one or more of 2.4 GHz, 5 GHz, 6 GHz, or the like). The WiFi APs 120 each support a set of WiFi radios 121 (illustratively, WiFi AP 120-1 supports WiFi radios 121-11 and 121-12 and WiFi AP 120-A supports WiFi radios 121-A1 and 121-A2) configured to support WiFi-based communications of the WiFi clients 110. In the example of FIG. 1 for purposes of clarity, each of the WiFi APs 120 is depicted as a dual-band device supporting the 2.4 GHz band and the 5 GHz band; however, it will be appreciated that WiFi APs 120 may include single-band devices (e.g., supporting only one of 2.4 GHz, 5 GHz, 6 GHz, or the like), multi-band devices supporting other numbers or combinations of WiFi radio bands, or the like, as well as various combinations thereof. The WiFi APs 120 are configured to support control over association of WiFi clients 110 with the WiFi APs 120. The WiFi APs are configured to support control over association of WiFi clients 110 with the WiFi APs 120 by receiving association requests from the WiFi clients 110 in which the WiFi clients 110 request association with particular WiFi radio bands of the WiFi APs 120 and the WiFi APs 120 accept or deny the association requests for permitting or preventing association of the WiFi clients 110 with the WiFi APs 120. It will be appreciated that the WiFi APs 120 also may be referred to herein as WiFi routers.

The WiFi access controller 130 is configured to support control over association of WiFi clients 110 with WiFi APs 120. The WiFi access controller 130 may be configured to support control over association of WiFi clients 110 with WiFi APs 120 based on WiFi access control information 131 which is determined by the WiFi access controller 130 (illustrated as the WiFi access control information 131 maintained on the WiFi access controller 130) and provided by the WiFi access controller 130 to the WiFi APs 120 for use by the WiFi APs 120 in controlling association of WiFi clients 110 with the WiFi APs 120 (illustrated as the WiFi access control information 131-1 to 131-A maintained on WiFi APs 120-1 to 120-A, respectively, which may be considered to represent portions of the WiFi access control information 131 specific to the WiFi APs 120, respectively). The WiFi access control information 131 maintained on the WiFi APs 120 may be used by the WiFi APs 120 in handling association requests from the WiFi clients 110, thereby enabling the WiFi APs 120 to control association of WiFi clients 110 with the WiFi APs 120 and WiFi radio bands of the WiFi APs 120.

The WiFi access controller 130 may determine the WiFi access control information 131 in various ways. The WiFi access controller 130 may determine the WiFi access control information 131 based on various types of input information (e.g., capability information, performance data, or the like, as well as various combinations thereof) which may be obtained by the WiFi access controller 130 from various sources of such information (e.g., WiFi APs 120, operations support systems such as operations support systems (OSSs) and or business support systems (BSSs), or the like, as well as various combinations thereof). The WiFi access controller 130 may determine the WiFi access control information 131 based on various types of processing of various combinations of input information to select WiFi clients 110 for which association with WiFi APs 120 is to be controlled (e.g., prevented by rejecting association requests from the WiFi clients 110). It will be appreciated that the WiFi access controller 130 may determine the WiFi access control information 131 in various other ways.

The WiFi access controller 130 may determine the WiFi access control information 131 based on various types of input information. For example, the WiFi access controller 130 may determine the WiFi access control information 131 based on capability information (e.g., WiFi client capability information indicative of capabilities of the WiFi clients 110 (e.g., WiFi radio band(s) supported, WiFi client device type information, or the like, as well as various combinations thereof)), performance data collected by the WiFi APs 120 and provided to the WiFi access controller 130 (e.g., WiFi client performance data indicative of the performance of WiFi clients 110 associated with WiFi APs 120, WiFi radio band performance information indicative of the performance of WiFi radio bands of the APs 120, or the like, as well as various combinations thereof), or the like, as well as various combinations thereof. It will be appreciated that the input information used for generating the WiFi access control information 121 may include various other types of information, may be collected, shared, and used in various other ways, or the like, as well as various combinations thereof.

The WiFi APs 120 may be configured to provide information to the WiFi access controller 130 (e.g., capability information of associated WiFi clients 110, performance information of associated WiFi clients 110, WiFi radio band performance information of WiFi radio bands of the WiFi APs 120, or the like, as well as various combinations thereof) for use by the WiFi access controller 130 in supporting control over association of WiFi clients 110 with WiFi APs 120 and WiFi radio bands of WiFi APs (e.g., generation of WiFi access control information to be provided to the WiFi APs 120 for use in controlling association of WiFi clients 110 with the WiFi APs 120, determination of WiFi access policy information to be provided to the WiFi APs 120 for use in local generation of WiFi access control for use by the WiFi APs 120 for controlling association of WiFi clients 110 with the WiFi APs 120). The information may be collected and sent periodically, in response to conditions, or the like, as well as various combinations thereof. The information may be collected and sent based on various information representation and communication capabilities, such as by using various formats, protocols, or the like, as well as various combinations thereof (e.g., JavaScript Object Notation (JSON), YAML, eXtensible Markup Language (XML), User Services Platform (USP)/TR-369 periodic bulk data or the like, as well as various combinations thereof).

The WiFi APs 120 may be configured to provide capability information of associated WiFi clients 110 to the WiFi access controller 130 for use by the WiFi access controller 130 in supporting control over association of WiFi clients 110 with WiFi APs 120 and WiFi radio bands of WiFi APs. The capability information of associated WiFi clients 110 may include indications of device type, IEEE 802.11 standards supported, HTMode, or the like, as well as various combinations thereof. The capability information of associated WiFi clients 110 may be collected and sent periodically, in response to conditions (e.g., association of WiFi clients 110 with the WiFi APs 120, or the like), or the like, as well as various combinations thereof. The capability information of associated WiFi clients 110 may be collected and sent based on various information representation and communication capabilities (e.g., formats, protocols, or the like, as well as various combinations thereof).

The WiFi APs 120 are configured to collect performance information of associated WiFi clients 110 and send the performance information of the associated WiFi clients to the WiFi access controller 130. The performance information of the associated WiFi clients 110 may be collected and sent periodically, in response to conditions, or the like, as well as various combinations thereof. The performance information of the associated WiFi clients 110 may include various performance metrics, such as RSSI level (e.g., the RSSI level perceived by the WiFi AP 120 for each associated WiFi client 110), throughput metrics (e.g., average downlink throughput and/or average uplink throughput), bitrate metrics (e.g., transmission bitrate and/or received bitrate), HTMode (which may indicate which WiFi radio bands are supported by the WiFi clients 110), or the like, as well as various combinations thereof. The capability information of associated WiFi clients 110 may be collected and sent based on various information representation and communication capabilities (e.g., formats, protocols, or the like, as well as various combinations thereof). For example, an example of a JSON format of metrics of a WiFi client 110 which may be provided by a WiFi AP 120 to the WiFi access controller 130 follows:

```
sta_info"
{
    "mac_address": "7c:7a:91:c0:35:69",
    "ip_address": "10.168.2.197",
    "hostname": " ",
    "dl throughput": 704,
    "ul_throughput": 384,
    "tx_bitrate": 173,
    "rx bitrate": 144,
    "tx_packets": 15,
    "rx_packets": 21,
    "tx_bytes": 5310,
    "rx_bytes": 2900,
    "tx_per": 0,
    "signal": -40,
    "htMode": "11AC_VHT20",
    "capBits": 0,
    "assoc_time": 2165
}
```

It will be appreciated that the performance information of associated WiFi clients 110 that is collected by the WiFi APs 120 and provided to the WiFi access controller 130 may include various other types of performance information, may be collected and provided in various other ways, or the like, as well as various combinations thereof.

The WiFi APs 120 may be configured to collect WiFi radio band performance information of WiFi radio bands of the WiFi APs 120 and send the WiFi radio band performance information WiFi radio bands of the WiFi APs 120 to the WiFi access controller 130. The WiFi radio band performance information of WiFi radio bands of the WiFi APs 120 may be collected and sent periodically, in response to conditions, or the like, as well as various combinations thereof. The WiFi radio band performance information of WiFi radio bands of the WiFi APs 120 may include various WiFi radio band performance metrics, such as radio status information, congestion level, Independent Basic Service Set (IBSS) occupancy level, Overlapping Basic Service Set (OBSS) occupancy level, or the like, as well as various combinations thereof. The WiFi radio band performance information of WiFi radio bands of the WiFi APs 120 may be collected and sent based on various information representation and communication capabilities (e.g., formats, protocols, or the like, as well as various combinations thereof). For example, an example of a JSON format of WiFi radio band performance information of WiFi radio bands of a WiFi AP 120 which may be provided by the WiFi AP 120 to the WiFi access controller 130 follows:

```
"radio_interface": [
{
```

"interface_name": "rax0",
"ssid": "mySSID",
"mac_address": "02:05:9e:c8:97:67",
"frequency": 2437,
"tx_power": "20",
"num_of_stas": 1,
"tx_packets": 15,
"rx_packets": 21,
"dl throughput": 704,
"ul_throughput": 384,
"signal": −40,
"tx_per": 0,
"channel_own_usage_ratio": 22,
"rx_per": 0,
"tx_prr": 0, It will be appreciated that the WiFi radio band performance information of WiFi radio bands of the WiFi APs 120 that is collected by the WiFi APs 120 and provided to the WiFi access controller 130 may include various other types of WiFi radio band performance information, may be collected and provided in various other ways, or the like, as well as various combinations thereof.

It will be appreciated that the input information used for generating the WiFi access control information 131 may include various other types of information, may be collected, shared, and used in various other ways, or the like, as well as various combinations thereof.

The WiFi access controller 130 may generate various types of WiFi access control information 131 to be provided to the WiFi APs 120 for use by the WiFi APs 120 in controlling access by WiFi clients 110 to WiFi APs 120 and WiFi radio bands of WiFi APs 120. The WiFi access control information 131 may include Access Control Lists (ACLs), instructions associated with application of ACLs by WiFi APs 120 for controlling association of WiFi clients 110 with WiFi APs 120 and radio bands of WiFi APs 120, or the like, as well as various combinations thereof. The ACLs may identify WiFi clients 110 in various ways, such as based on MAC addresses of the WiFi clients 110 and/or using other suitable identifiers of the WiFi clients 110. The WiFi access control information 131 may include various parameters which may be used by the WiFi APs 120 in conjunction with the ACLs for controlling association of WiFi clients 110 with WiFi APs 120 and radio bands of WiFi APs 120. For example, parameters which may be used by a WiFi AP 120 in conjunction with the ACL for controlling association of WiFi clients 110 with WiFi AP 120 and radio bands of WiFi AP 120 may include an ACL flag which may be used to enable and disable use of the ACL (and, optionally, to indicate whether the centralized or local mode of operation is to be used when use of the ACL is enabled), an inactivity timer for WiFi clients 110 (e.g., for monitoring whether a WiFi client 110 has not been associated with the WiFi AP 120 for more than the inactivity time and, as such, may be removed from the ACL), an RSSI deactivation threshold for WiFi clients 110 (e.g. the minimum RSSI level that must be met in order for the WiFi client to be maintained in the ACL or put back into the ACL), or the like, as well as various combinations thereof). It will be appreciated that the WiFi access control information 131 provided to the WiFi APs 120 for use by the WiFi APs 120 in controlling access by WiFi clients 110 to WiFi APs 120 and WiFi radio bands of WiFi APs 120 may include various other types of information.

The ACLs for the WiFi APs 120 may be used by the WiFi APs 120 for blacklisting of WiFi clients 110 from associating with particular WiFi radio bands of the WiFi APs 120.

The ACLs for the WiFi APs 120 may be used by the WiFi APs 120 for blacklisting of WiFi clients 110 from associating with particular WiFi radio bands of the WiFi APs 120 by blocking authentication of the WiFi clients 110 during attempts by the WiFi clients to associate with the particular WiFi radio bands of the WiFi APs 120. The ACLs for the WiFi APs 120 may include, for each of the WiFi APs 120, at least one ACL associated with at least one WiFi radio band of the WiFi AP 120 for use in controlling association by WiFi clients 110 with the WiFi AP 120. For example, where a WiFi AP 120 supports 2.4 GHz and 5 GHz radio bands, the WiFi AP 120 may maintain a 2.4 GHz ACL for the 2.4 GHz band to track a list of WiFi clients 110 to be prevented from accessing the 2.4 GHz band (e.g., without any corresponding ACL for the 5 GHz band), a 5 GHz ACL for the 5 GHz band to track a list of WiFi clients 110 to be prevented from accessing the 5 GHz band (e.g., without any corresponding ACL for the 2.4 GHz band), or both a 2.4 GHz ACL for the 2.4 GHz band to track a list of WiFi clients 110 to be prevented from accessing the 2.4 GHz band and a 5 GHz ACL for the 5 GHz band to track a list of WiFi clients 110 to be prevented from accessing the 5 GHz band. For example, where a WiFi AP 120 supports 2.4 GHz, 5 GHz, and 6 GHz radio bands, the WiFi 120 may maintain a 2.4 GHz ACL for the 2.4 GHz band to track a list of WiFi clients 110 to be prevented from accessing the 2.4 GHz band (e.g., without any corresponding ACLs for the 5 GHz band and 6 GHz), a 5 GHz ACL for the 5 GHz band to track a list of WiFi clients 110 to be prevented from accessing the 5 GHz band (e.g., without any corresponding ACLs for the 2.4 GHz band and 6 GHz), a 6 GHz ACL for the 6 GHz band to track a list of WiFi clients 110 to be prevented from accessing the 6 GHz band (e.g., without any corresponding ACLs for the 2.4 GHz band and 5 GHz), and so forth. It will be appreciated that various other arrangements of ACLs may be maintained on the WiFi APs 120 for controlling association of WiFi clients 110 with the WiFi APs 120.

The ACLs for the WiFi APs 120 may be used by the WiFi APs 120 for blacklisting of WiFi clients 110 from associating with particular WiFi radio bands of the WiFi APs 120. The ACL for a particular WiFi radio band of a WiFi AP 120 may identify the WiFi clients 110 in various ways, such as by using MAC addresses of the WiFi clients 110 and/or other types of identification information which may be used to identify WiFi clients 110 when the WiFi clients 110 request association with WiFi radio bands of the WiFi APs 120. The ACL for a particular WiFi radio band of a WiFi AP 120 may include various other types of information which may be associated with the WiFi clients 110 identified in the ACL for the particular WiFi radio band of the WiFi AP 120. It will be appreciated that the ACLs for the WiFi APs 120 may include various other types of information which may be used to control access by WiFi clients 110 to WiFi radio bands of WiFi APs 120, may include various other arrangements of the information which may be used to control access by WiFi clients 110 to WiFi radio bands of WiFi APs 120, or the like, as well as various combinations thereof.

The WiFi AP 120, based upon an association request by a WiFi client 110 to associate with a particular WiFi radio band, may determine whether there is an ACL for the WiFi radio band. If there is no ACL on the WiFi AP 120 for the WiFi radio band requested by the WiFi client 110, then the WiFi AP 120 may accept the request of the WiFi client to associate with the WiFi radio band. If there is an ACL for the ACL on the WiFi AP 120 for the WiFi radio band requested by the WiFi client 110, the WiFi AP 120 uses the ACL to determine whether or accept the request by the WiFi client 110 to access that WiFi radio band or to deny the request by the WiFi client 110 to access that WiFi radio band. The WiFi AP 120, based on a determination that the WiFi client 110 is on the ACL for the requested WiFi radio band, permits the association of the WiFi client 110 with that WiFi radio band on the WiFi AP 120. The WiFi AP 120, based on a determination that the WiFi client 110 is on the ACL for the requested WiFi radio band, prevents the WiFi client 110 from associating with that WiFi radio band, in which case the WiFi client 110 may request to associate with a different WiFi radio band on that WiFi AP 120 or may request to associate with another WiFi AP 120 (on the requested WiFi radio band or a different WiFi radio band). In this manner, the WiFi APs 120 are able to control association by the WiFi clients 110 with particular WiFi radio bands of the WiFi APs 120 while still enabling the WiFi clients 110 to autonomously select WiFi APs 120 with which to associate.

The WiFi access controller 130 may provide the WiFi access control information 131 to the WiFi APs 120 in various ways.

The WiFi access controller 130 may provide the WiFi access control information 131 to the WiFi APs 120 periodically, in response to various conditions, or the like, as well as various combinations thereof. For example, the WiFi access controller 130 may provide the WiFi access control information 131 to the WiFi APs 120 in response to boot up of WPs 120 (e.g., initial booting of WiFi APs 120, rebooting of WiFi APs 120 after failures, or the like), in response to detection of conditions associated with WiFi APs 120 (e.g., congestion, recovery from failure, or the like), in response to detection of conditions associated with WiFi clients 110, in response to changes in the WiFi access control information 131 on the WiFi access controller 130 (e.g., based on changes to the status of WiFi APs 120, based on changes to the status of WiFi clients 110, or the like), or the like, as well as various combinations thereof.

The WiFi access controller 130 may provide the WiFi access control information 131 to the WiFi APs 120 at various scales. For example, the WiFi access controller 130 may provide the WiFi access control information 131 to the WiFi APs 120 using full synchronizations (e.g., the full set of WiFi access control information 131-x associated with a WiFi AP 120-x is provided to the WiFi AP 120-x when the WiFi access control information 131-x of the WiFi AP 120 is to be updated), delta synchronizations (e.g., only changes to WiFi access control information 131-x associated with a WiFi AP 120-x are provided to the WiFi AP 120-x when the WiFi access control information 131-x of the WiFi AP 120 is to be updated), or the like, as well as various combinations thereof.

The WiFi access controller 130 may provide the WiFi access control information 131 to the WiFi APs 120 using various communication mechanisms. For example, the WiFi access controller 130 may provide the WiFi access control information 131 to the WiFi APs 120 using a RESTful HTTP interface based on a polling/polling response mechanism (e.g., the WiFi access controller 130 may receive polling messages from the WiFi APs 120 and, if configuration changes have occurred, may reply to the polling messages with corresponding polling responses that include WiFi access control information 131). For example, the WiFi access controller 130 may provide the WiFi access control information 131 to the WiFi APs 120 based on use of MQTT, in which case the WiFi APs 120 may simply subscribe to the relevant configuration fields to receive updates. For example, the WiFi access controller 130 may provide the WiFi access control information to the WiFi APs 120 based on TR-369.

It will be appreciated that the WiFi access controller 130 may provide the WiFi access control information 131 to the WiFi APs 120 in various other ways.

The WiFi access controller 130 and the WiFi APs 120, as indicated above, may support a "centralized" mode of operation (also referred to herein as a "controller" mode of operation) in which the WiFi access controller 130 determines the WiFi access control information 121 and provides the WiFi access control information 121 to the WiFi APs 120, and the WiFi access controller 130 also performs monitoring functions for modifying the WiFi access control information 121 based on monitoring of WiFi clients 110 (e.g., various information collected by the WiFi APs 120 is provided by the WiFi APs 120 to the WiFi access controller 130 for use by the WiFi access controller 130 in modifying the WiFi access control information 121 of the WiFi APs 120).

In at least some example embodiments of the centralized mode of operation, the WiFi access controller 130 may monitor various conditions associated with WiFi clients 110 and prevent certain WiFi clients 110 from associating with certain WiFi radio bands of WiFi APs 120 when certain conditions are satisfied. For example, the WiFi access controller may identify dual-band WiFi clients 110 supporting both the 2.4 GHz and 5 GHz bands, verify that the same SSID is being used on the 2.4 GHz and 5 GHz bands for such dual-band WiFi clients 110, monitor the RSSI levels of WiFi clients 110 on the 5 GHz band (e.g., to ensure that an acceptable RSSI is projected for any dual-band WiFi clients 110 which may be forced off of the 2.4 GHz band and onto the 5 GHz band) and, based on one or more other conditions (e.g., a determination that the 2.4 GHz is over-utilized, a determination that the 5 GHz band is under-utilized, a preference of a WiFi client 110 to operate over the 5 GHz band, or the like), insert one or more of the dual-band WiFi clients 110 into the ACL for the 2.4 GHz band in order to prevent the one or more dual-band WiFi clients 110 from associating with the 2.4 GHz band and, thus, to force the one or more dual-band WiFi clients 110 to associate with the 5 GH band. The WiFi access controller 130 may identify dual-band capable WiFi clients 110 based on identification that the WiFi client 110 supports a higher frequency band typically paired with a lower frequency band in WiFi clients 110 (e.g., dual-band capable WiFi clients 110 supporting the 2.4 GHz band and the 5 GHz band based on identification of WiFi clients 110 supporting the 5 GHz band (e.g., since such WiFi clients 110 typically also support the 2.4 GHz band), can identify dual-band capable WiFi clients 110 supporting the 5 GHz band and the 6 GHz band based on identification of WiFi clients 110 supporting the 6 GHz band (e.g., since such WiFi clients 110 typically also support the 5 GHz band), or the like). The WiFi access controller 130 may identify dual-band capable WiFi clients 110 in various ways, such as by monitoring one or more capability fields (e.g., HTMode in WiFi or the like), monitoring whether WiFi clients 110 were previously seen on particular WiFi radio bands (e.g., previously seen on the 5 GHz band for WiFi clients potentially supporting the 2.4 GHz and 5 GHz bands, previously seen on the 6 GHz band for WiFi clients potentially supporting the 5 GHz and 6 GHz bands, and so forth), or the like, as well as various combinations thereof. The WiFi access controller 130, based on a determination that the various conditions are met for one or more WiFi clients 110, adds those one or more WiFi clients to the WiFi access control information 131 for the 2.4 GHz band (e.g., the ACL for the 2.4 GHz band) and provides the WiFi access control information 131 for the 2.4 GHz band to the associated WiFi AP 120 such that those one or more WiFi clients 110 are blocked from associating with the 2.4 GHz band of the WiFi AP 120 and, thus, re-associate to the 5 GHz band of the WiFi AP 120 (e.g., some of the WiFi clients 110 may only request to re-associate to the 5 GHz band and the association request will be accepted by the WiFi AP 120 and/or some of the WiFi clients 110 may request to associate with both the 2.4 GHz band and the 5 GHz band and only the 5 GHz radio of the WiFi AP 120 will respond or acknowledge).

In at least some example embodiments of the centralized mode of operation, the WiFi access controller 130 may use RSSI information of WiFi clients 110 to control association of WiFi clients 110 with ACLs of WiFi APs 120. The WiFi APs 120 can monitor RSSI levels of WiFi clients 110 operating in the 5 GHz band and provide the RSSI levels of the WiFi clients 110 operating in the 5 GHz band to the WiFi access controller 130. The WiFi access controller 130 can use the RSSI levels of the WiFi clients 110 to add the WiFi clients to the 2.4 GHz ACL and remove the WiFi clients 110 from the 2.4 GHz ACL under various conditions. For example, the WiFi access controller 130, based on a determination that a WiFi client 110 on the 5 GHz ACL has a low RSSI, may remove the WiFi client 110 from the 2.4 GHz ACL in order to allow the WiFi client 110 to return to the 2.4 GHz band since the 2.4 GHz band may provide better coverage for the WiFi client 110. For example, the WiFi access controller 130, based on a determination that a WiFi client 110 that is not on the 2.4 GHz ACL has a high RSSI on the 5 GHze band, may add the WiFi client 110 to the 2.4 GHz ACL in order to permit the WiFi client 110 to leave the 2.4 GHz band since the 5 GHz band may provide better rate for the WiFi client 110.

In at least some example embodiments of the centralized mode of operation, the WiFi access controller 130 may use inactivity timers for WiFi clients 110 to control association of WiFi clients 110 with ACLs of WiFi APs 120. For example, the inactivity timer may be used to remove a WiFi client 110 from the ACL of a WiFi AP 120 if the WiFi client 110 is away from the WiFi AP 120 for a period that exceeds the inactivity timer. This may be used in various situations. For example, this may be used such that a WiFi client 110 when returning to a household after the disconnection timer, may be allowed to reconnect to 2.4 GHz in case of a low signal. This functionality may be used to prevent the so-called "garage scenario" in which a customer where customer returning to their house and parked in their garage would not be able to connect the WiFi client 110 to the WiFi AP 120 at the home. For example, the inactivity timer may be used to prune inactive WiFi clients 110 from the ACL. It will be appreciated that the WiFi access controller 120 may use inactivity timers in various other ways for controlling association of WiFi clients 110 with ACLs of WiFi APs 120.

In at least some example embodiments of the centralized mode of operation, the WiFi access controller 130 may be configured, for any WiFi AP 120, to verify the congestion level of the 5 GHz radio of the WiFi AP 120 and, based on a determination that the 5 GHz radio of the WiFi AP 120 is congested, to deactivate the ACL flag so that WiFi clients operating in 5 GHz may (at least temporarily) be allowed to operate in 2.4 GHz. In at least some example embodiments, associated hysteresis logic may be applied as follows: (1) if the WiFi AP is not 5G congested, then the 5 GHz congestion level needs to be greater than a configurable threshold (e.g., 60%, 65%, or the like) plus some amount of hysteresis (e.g., 10%, 12%, or the like) in order to change the state of the 5 GH radio of the WiFi AP 120 from the "5G Not Congested" state to the "5G Congested" state and send to the WiFi AP 120 a flag to disable the ACL for the 2.4 GHz band and (2) if the WiFi AP is 5G congested, then the 5 GHz congestion level needs to be less than a configurable threshold (e.g., 60%, 65%, or the like) minus some amount of hysteresis (e.g., 10%, 12%, or the like) in order to change the state of the 5 GH radio of the WiFi AP 120 from the "5G Congested" state to the "5G Not Congested" state and send to the WiFi AP 120 a flag to enable the ACL for the 2.4 GHz band.

In at least some example embodiments of the centralized mode of operation, the WiFi access controller 130 may utilize various other information and capabilities for controlling association of WiFi clients 110 with WiFi radio bands of WiFi APs 120. In at least some example embodiments, for example, a deactivation RSSI threshold (which defines the minimum RSSI level that must be met in order to control transitions keep the WiFi client 110 in the ACL) may be used to force WiFi clients 110 to switch between the 2.4 GHz band and the 5 GHz band based on changing RSSI levels of the WiFi clients in the 5 GHz band. For example, the deactivation RSSI threshold may be used to enable WiFi clients 110 that have low RSSI (i.e., poor performance) in the 5 GHz band to switch to the 2.4 GHz band which normally has a better range. Similarly, for example, when a WiFi client 110 is on the 2.4 GHz band and a determination is made that the RSSI level of the WiFi client 110 in the 5 GHz band rises above the deactivation RSSI threshold, the WiFi client 110 may be inserted into the ACL for the 2.4 GHz band to force the WiFi client 110 back onto the 5 GHz band. The WiFi access controller 130 may be configured to prevent ping ponging of WiFi clients 110 onto and off of the ACL for the 2.4 GHz band (and, thus, between association with the 5 GHz band and the 2.4 GHz band) based on use of a timer (e.g., the WiFi access controller 130, after detecting that the deactivation RSSI threshold has been crossed for the WiFi client 110, waits until the timer expires before moving the WiFi client 110 onto or off of the ACL for the 2.4 GHz band to ensure that the deactivation RSSI threshold is not crossed again), which may be useful where the RSSI level of the WiFi client 110 is near the deactivation RSSI threshold such that it repeatedly or at least frequently crosses the deactivation RSSI threshold. In at least some example embodiments, for example, the WiFi access controller 130 may perform fingerprinting of WiFi clients 110 to identify WiFi clients 110 satisfying particular conditions (e.g., to identify sticky WiFi clients 110, to identify WiFi clients exhibiting poor 5 GHz performance, or the like, as well as various combinations thereof). For example, the WiFi access controller 130 may monitor for poor performance when a WiFi client 110 is moved to the 5 GH band and may blacklist the WiFi client 110 from being added to the ACL for the 2.4 GHz band (where the blacklisting may be permanent, temporary (e.g. timer-based blacklisting), or the like). It will be appreciated that the WiFi access controller 130 may utilize various other information and capabilities for controlling association of WiFi clients 110 with WiFi radio bands of WiFi APs 120.

It will be appreciated that various other functions may be supported within the centralized mode of operation for supporting control over access by WiFi clients 110 to WiFi APs 120 and WiFi radio bands of WiFi APs 120.

The WiFi access controller 130 and the WiFi APs 120, as indicated above, may support a "local" mode of operation in which the WiFi access controller 130 determines the WiFi access control information 121 and provides the WiFi access control information 121 to the WiFi APs 120, and WiFi APs 120 perform at least some monitoring functions for modifying the WiFi access control information 121 based on monitoring of WiFi clients 110 (e.g., various information collected by the WiFi APs 120 is used by the WiFi APs 120 to modify the WiFi access control information 121 of the WiFi APs 120).

In at least some example embodiments of the local mode of operation, the monitoring of multi-band capable WiFi clients 110 may be performed in the WiFi APs 120 while the configuration of the ACLs on the WiFi APs 120 is performed by the WiFi access controller 130. For example, the monitoring of the congestion level of the 5 GHz radio of a WiFi AP 120 may remain in the WiFi access controller 130 such that the WiFi access controller 130 can dynamically activate and deactivate the ACL flag for the WiFi AP 120 depending on the congestion level of the 5 GHz radio of the WiFi AP 120 (e.g., based on the RSSI threshold for the WiFi AP 120 that is monitored by the WiFi access controller 130). It is noted that the WiFi AP 120 may verify that the same SSID is being used for the 2.4 GHz and 5 GHz radio bands on the WiFi AP 120.

If the 2.4 GHz ACL flag is to be set to "local ACL" for a WiFi AP 120 by the WiFi access controller 130, the WiFi access controller 130 may set the 2.4 GHz ACL flag to "local ACL" and send the "local ACL" flag to the WIFI AP 120 to signify to the WiFi AP 120 that the monitoring of dual band capability of WiFi clients 110 and the monitoring of inactivity of WiFi clients 110 are to be performed by the WiFi AP 120 rather than the WiFi access controller 130. The WiFi access controller 130, in addition to setting the 2.4 GHz ACL flag to "local ACL", also may provide information for use by the WiFi AP 120 to perform the monitoring of dual band capability of WiFi clients 110 and the monitoring of inactivity of WiFi clients 110 (e.g., a deactivation timer inactivity timeout threshold for the ACL of the WiFi AP 120).

If the 2.4 GHz ACL flag is set to "local ACL" for a WiFi AP 120, the WiFi AP 120 may (1) track which WiFi clients 110 have been seen on 5 GHz and will keep that list (denoted herein as a 5 GHz capable list) in permanent storage and (2) track which WiFi clients 120 have recently been associated to the WiFi AP 120. The tracking of which WiFi clients 110 have been seen on 5 GHz may be performed by tracking the association of the WiFi clients with particular WiFi radio bands of the WiFi APs 120. The tracking of which WiFi clients 120 have recently been associated to the WiFi 120 may be performed based on use of an inactivity timer and based on a configurable threshold length of time (e.g., within a threshold length of time, such as thirty minutes, one hour, two hours, or the like).

If the 2.4 GHz ACL flag is set to "local ACL" for a WiFi AP 120, the WiFi AP 120 may add WiFi clients 110 to the locally maintained ACL on the WiFi AP 120 and remove WiFi clients 110 from the locally maintained ACL on the WiFi AP under various conditions. For example, if the 2.4 GHz ACL flag is set to "local ACL" for a WiFi AP 120, the WiFi AP 120 may add WiFi clients 110 to the locally maintained ACL based on determinations that the WiFi clients 110 are recently associated to the WiFi AP 120 and that are part of the 5 GHz capable list. For example, if the 2.4 GHz ACL flag is set to "local ACL" for a WiFi AP 120, the WiFi AP 120 may remove WiFi clients 110 from the locally maintained ACL based on a determination that the WiFi clients 110 have RSSIs lower than the deactivation threshold in 5 GHz. In at least some example embodiments, hysteresis logic may be applied in order to prevent the ping-ponging of WiFi clients 110 onto and off of the ACL based on changing conditions.

It will be appreciated that various other functions may be supported within the local mode of operation for supporting control over access by WiFi clients 110 to WiFi APs 120 and WiFi radio bands of WiFi APs 120.

The WiFi access controller 130 may be configured to support various other functions in addition to controlling association of WiFi clients 110 to WiFi access points 120 and radio bands of the WiFi access points 120. For example, the WiFi access controller 130 may be configured to radio resource management (RRM) functions, self-optimizing network (SON) functions, or the like, as well as various combinations thereof. For example, the WiFi access controller 130 may be configured to provide channel management (e.g., initial channel management, active channel management, long term optimization of channel management, or the like, as well as various combinations thereof. For example, the WiFi access controller 130 may be configured to provide power control. For example, the WiFi access controller 130 may be configured to provide band steering (e.g., low signal steering, strong 2.4 GHz to 5 GHz steering, congestion band steering, or the like, as well as various combinations thereof. For example, the WiFi access controller 130 may be configured to provide multi-AP steering. It will be appreciated that the WiFi access controller 130 may be configured to provide various other functions.

It will be appreciated that various example embodiments presented herein for controlling association of WiFi clients 110 with WiFi APs 120, although primarily presented with respect to controlling association of WiFi clients 110 with particular types of WiFi radio bands (namely, the 2.4 GHz band and the 5 GHz band), may be used to control associated of WiFi clients 110 with various other WiFi radio bands (e.g., the 5 GHz and 6 GHz bands, the 2.4 GHz, 5 GHz, and 6 GHz bands, or the like, as well as various combinations thereof). For example, where the 5 GHz and 6 GHz bands are supported, various example embodiments presented herein for controlling association of WiFi clients 110 with WiFi APs 120 may be used to steer WiFi clients 110 to the 6 GHz band by preventing association over the 5 GHz band. For example, where the 2.4 GHz, 5 GHz, and 6 GHz bands are supported, various example embodiments presented herein for controlling association of WiFi clients 110 with WiFi APs 120 may be used to steer WiFi clients 110 to the 6 GHz band by preventing association over the 2.4 GHz band and the 5 GHz band. It will be appreciated that various example embodiments presented herein for controlling association of WiFi clients 110 with WiFi APs 120 may be used for controlling association of WiFi clients 110 with various other types and combinations of WiFi bands.

It will be appreciated that various example embodiments presented herein for controlling association of WiFi clients 110 with WiFi APs 120, although primarily presented with respect to controlling association of WiFi clients 110 with WiFi radio bands of the same WiFi AP 120, may be used for controlling association of WiFi clients 110 with WiFi radio bands across different WiFi APs 120. For example, various example embodiments presented herein for controlling association of WiFi clients 110 with WiFi APs 120 may be used to block WiFi clients 110 from associating with a first WiFi AP 120 in one radio band in order to steer the WiFi clients to a second WiFi AP 120 in the vicinity (assuming that the WiFi APs 120 share a common SSID). This scheme may be used to balance the load across multiple WiFi APs 120 in a given vicinity. The load balancing of WiFi clients 110 across WiFi APs 120 in this manner may be controlled by the WiFi access controller 130 based on tracking of WiFi APs 120 which are associated for load balancing purposes (e.g., WiFi APs 120 sharing a common SSID), monitoring of the load on the WiFi APs 120 which are associated for load balancing purposes, and controlling association of the WiFi clients 110 with the WiFi APs 120 which are associated for load balancing purposes (based on use of WiFi access control information on the WiFi APs 120 which are associated for load balancing purposes) so as to control the load on the WiFi APs 120 which are associated for load balancing purposes.

It will be appreciated that the communication system 100 may be configured to support various other functions for supporting control over association of WiFi clients to WiFi access points and radio bands of WiFi access points.

Figure 2:
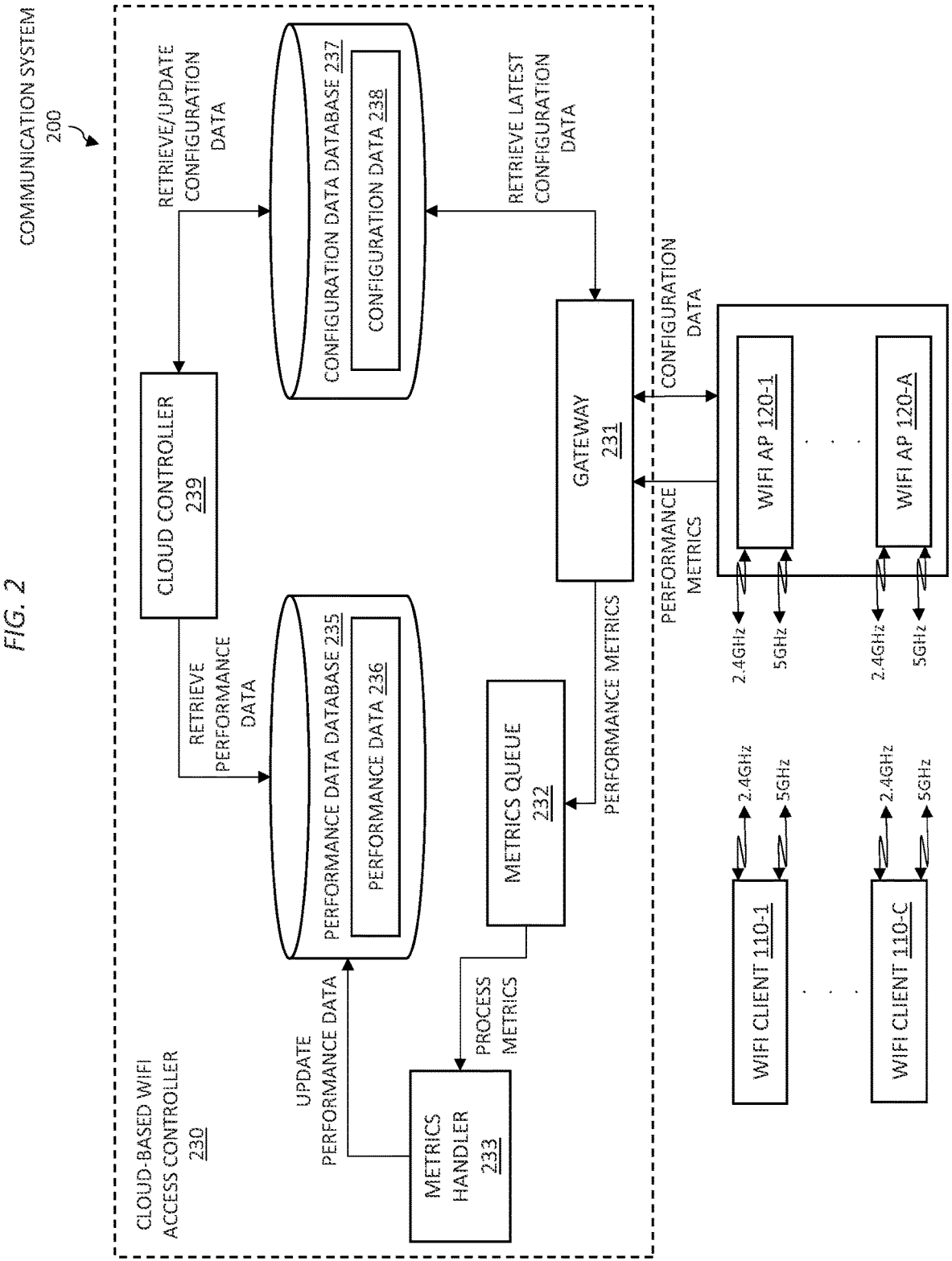
FIG. 2 depicts an example embodiment of the communication system of FIG. 1 in which the WiFi access controller is implemented using a cloud-based implementation of the WiFi access controller.

FIG. 2 depicts an example embodiment of the communication system 100 of FIG. 1 in which the WiFi access controller 130 is implemented using a cloud-based implementation of the WiFi access controller 130.

In FIG. 2, the communication system 200 is similar to the communication system 100 of FIG. 1 in that the WiFi clients 110 and WiFi APs 120 are present; however, the WiFi access controller 130 of FIG. 1 is replaced by a cloud-based WiFi access controller 230 which provides a cloud-based implementation of the WiFi access controller 130 of FIG. 1.

In FIG. 2, cloud-based WiFi access controller 230 may be based on one or more cloud entities which may be associated with one or more clouds. For example, cloud-based WiFi access controller 230 may be implemented using one or more publicly hosted cloud entities, one or more privately hosted cloud entities, or the like, as well as various combinations thereof.

In FIG. 2, cloud-based WiFi access controller 230 includes a gateway 231, a metrics queue 232, a metrics handler 233, a performance data database 235 storing performance data 236, a configuration data database 237 storing configuration data 238, and a cloud controller 239. The gateway 231 may be an HTTP RESTful gateway or other suitable type of gateway. The metrics handler 233 may be implemented as a microservice. The cloud controller 239 may be implemented as a microservice.

The gateway 231 receives incoming performance metrics from WiFi APs and stores the performance metrics in the metrics queue 232. The gateway 231 may store the performance metrics in the metrics queue 232 in a stateless manner. The gateway 231 may store the performance metrics in the metrics queue 232 as metrics messages received by the gateway 231 from the WiFi APs. The metrics handler 233 processes the performance metrics in the metrics queue 232 to form performance data 236 and stores the performance data 236 in the performance data database 235.

The cloud controller 239 performs various functions for supporting control over association of WiFi clients to WiFi APs and radio bands of WiFi APs. The cloud controller 239 supports control over association of WiFi clients to WiFi APs and radio bands of WiFi APs based on the performance data 236 in the performance data database 235 and/or the configuration data 238 in the configuration data database 237.

The cloud controller 239 retrieves the performance data 236 from the performance data database 235 and uses the performance data 236 for various functions associated with supporting control over association of WiFi clients to WiFi APs and radio bands of WiFi APs. For example, the cloud controller 239 may use the performance data to determine the capability of clients and whether clients operated in both 2.4 GHz and 5 GHz, determine if a WiFi client is operating in 2.4 GHz or 5 GHz, determine the RSSI level of a client, determine if the load of a given WiFi AP or band of a WiFi AP is at or near congestion, or the like, as well as various combinations thereof.

The cloud controller 239 retrieves the configuration data 238 from the configuration data database 237 and uses the configuration data 238 for various functions associated with supporting control over association of WiFi clients to WiFi APs and radio bands of WiFi APs. For example, the cloud controller 236 may use the configuration data to determine the radio status of WiFi APs, determine if the same SSID is used on both of the radio bands of WiFi APs, or the like, as well as various combinations thereof.

The cloud controller 239 supports control over association of WiFi clients to WiFi APs and radio bands of WiFi APs by determining WiFi access control information (e.g., ACLs for APs and so forth) and storing the WiFi access control information as part of the configuration data 238 in the configuration database 237 such that the gateway 231 may access the WiFi access control information and provide the WiFi access control information to the WiFi APs for use by the WiFi APs to control association of WiFi clients to WiFi APs and radio bands of WiFi APs.

The gateway 231 controls distribution of the WiFi access control information to the WiFi APs for use by the WiFi APs to control association of WiFi clients to WiFi APs and radio bands of WiFi APs. The gateway 231 may fetch the WiFi access control information from the configuration data 238 in the configuration database 237 and send the WiFi access control information to the WiFi APs. The gateway 231 may provide the WiFi access control information to the WiFi APs as initial configuration data for the WiFi APs (e.g., during registration of the WiFi APs), as the WiFi access control information is updated by the cloud controller 236, periodically, in response to polling requests from the WiFi APs (e.g., as polling responses when the WiFi access control information has changed and the changes need to be communicated to the WiFi APs), or the like, as well as various combinations thereof.

It will be appreciated that the cloud-based implementation of the WiFi access controller 130 may be implemented in various other ways.

Figure 3:
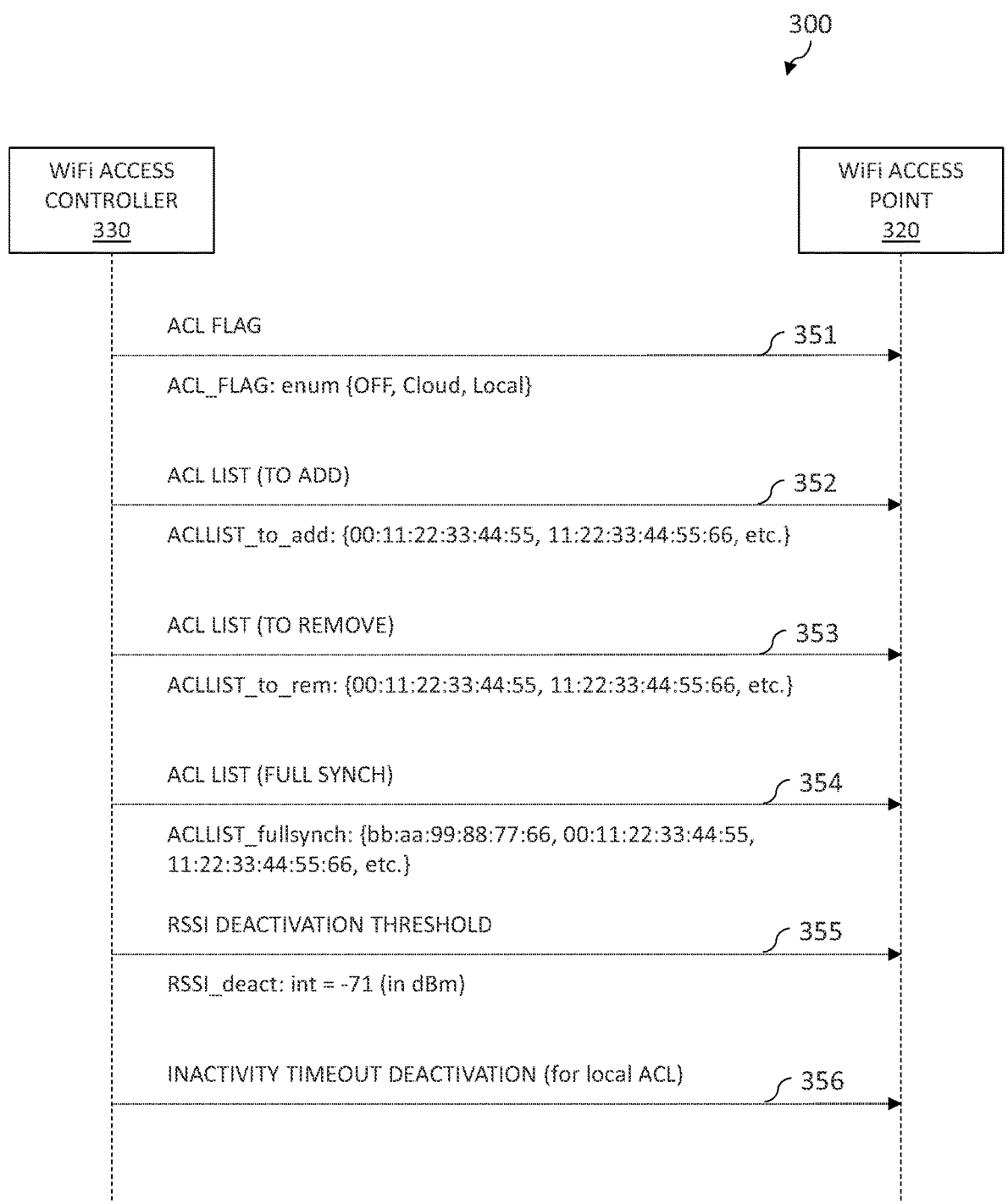
FIG. 3 depicts an example embodiment of an interface between a WiFi access controller and a WiFi access point for illustrating signaling associated with control by the WiFi access controller over the WiFi access point for controlling association of WiFi clients with the WiFi access point.

FIG. 3 depicts an example embodiment of an interface between a WiFi access controller and a WiFi access point for illustrating signaling associated with control by the WiFi access controller over the WiFi access point for controlling association of WiFi clients with the WiFi access point.

In FIG. 3, signaling between the WiFi access controller 330 and the WiFi access point 320 is configured to support control by the WiFi access controller 330 over the WiFi access point 320 for controlling association of WiFi clients with the WiFi access point 320.

In FIG. 3, the signaling includes signaling of the ACL flag from the WiFi access controller 330 over the WiFi access point 320 (illustrated as signaling 351). The ACL flag is used to activate and deactivate WiFi AP access control. For example, as illustrated in FIG. 3, where the WiFi access controller 330 and the WiFi access point 320 support three modes of operation (e.g., WiFi AP access control activated with centralized control, WiFi AP access control activated with local control, and WiFi AP access control deactivated), the ACL Flag may use values such as {OFF, Cloud, Local} to activate and switch between the different modes of operation (although it will be appreciated that other suitable values may be used). For example, although omitted from FIG. 3 for purposes of clarity, where the WiFi access controller 330 and the WiFi access point 320 support only two modes of operation (e.g., WiFi AP access control activated (whether using centralized or local modes of operation) and WiFi AP access control deactivated), ACL Flag may use Boolean values (e.g., values indicative of ON and OFF for activating and deactivating WiFi AP access control, respectively). The WiFi access point 320 may operate in the operational mode indicated by the signaling 351 received from the WiFi access controller 330. It will be appreciated that the ACL Flag may be implemented and signaled in various other ways for supporting WiFi AP access control.

In FIG. 3, the signaling includes signaling of ACL list information from the WiFi access controller 330 over the WiFi access point 320 (illustrated as signaling 352, 353, and 354). The ACL on the WiFi access point 320 may be maintained using a delta approach (which is illustrated as signaling 352 and 353) to reduce the bandwidth consumption and the frequency of a full synch (which is illustrated as signaling 354). In the delta approach, the WiFi access controller 330 may send the list of the WiFi clients being changed on the ACL that is maintained on the WiFi access point 320. For example, where one or more WiFi clients is being added to the ACL on the WiFi access point 320, the signaling 352 may be sent with a list of MAC addresses of the WiFi clients being added to the ACL and an indication that the WiFi clients are being added to the ACL, and the WiFi access point 320 may add those clients to the ACL based on the signaling 352 received from the WiFi access controller 330. For example, where one or more WiFi clients is being removed from the ACL on the WiFi access point 320, the signaling 352 may be sent with a list of MAC addresses of the WiFi clients being removed from the ACL and an indication that the WiFi clients are being removed from the ACL, and the WiFi access point 320 may remove those WiFi clients from the ACL based on the signaling 353 received from the WiFi access controller 330. The WiFi access controller 330 also may support a full synch operation in which the complete ACL is sent from the WiFi access controller 330 to the WiFi access point 320. For example, the signaling 354 which includes the complete ACL may be sent from the WiFi access controller 330 to the WiFi access point 320 periodically, in response to various conditions (e.g., at boot-up, after recovery from a failure, or the like), or the like, as well as various combinations thereof.

In FIG. 3, the signaling includes other types of signaling which may be used to support control by the WiFi access controller 330 over the WiFi access point 320 for controlling association of WiFi clients with the WiFi access point 320. As illustrated in FIG. 3, the WiFi access controller 330 supports signaling of an RSSI deactivation threshold which may be used by the WiFi access point 320 to remove WiFi clients from the WiFi access point 320 based on RSSI (illustrated as signaling 355). For example, as illustrated in FIG. 3, the signaling 355 may include an RSSI deactivation threshold for use by the WiFi access point 320 for removing, from the ACL on the WiFi access point 320, WiFi clients determined to have RSSIs lower than the RSSI deactivation threshold. As illustrated in FIG. 3, the WiFi access controller 330 supports signaling of an inactivity timeout deactivation signal which may be used by the WiFi access point 320 to remove WiFi clients from the WiFi access point 320 (illustrated as signaling 356) based on inactivity. For example, as illustrated in FIG. 3, the signaling 355 may include an inactivity timeout deactivation signal for use by the WiFi access point 320 for removing, from the ACL on the WiFi access point 320, WiFi clients which have not been associated with the WiFi access point 320 for more than the timeout.

It will be appreciated that various other types of signaling may be supported between the WiFi access controller 330 and the WiFi access point 320 for supporting control by the WiFi access controller 330 over the WiFi access point 320 for controlling association of WiFi clients with the WiFi access point 320.

Figure 4:
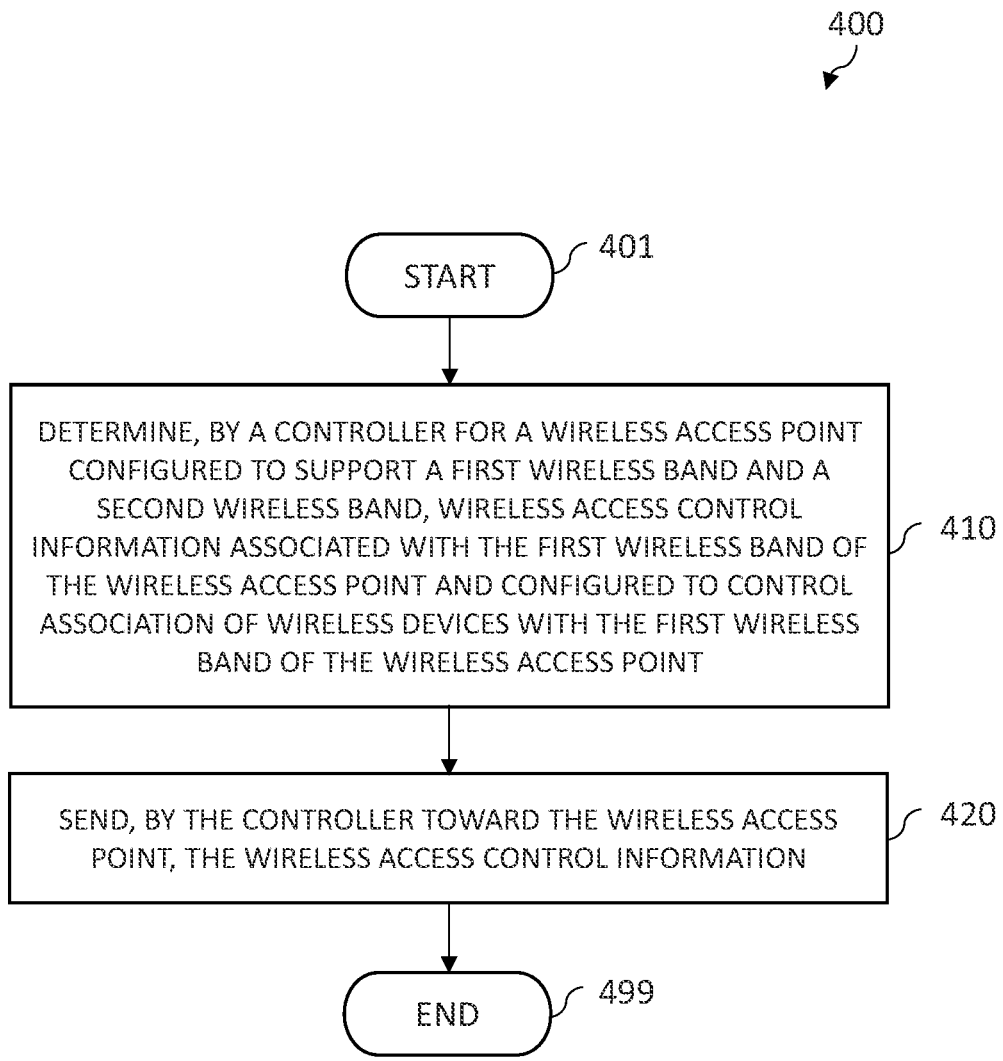
FIG. 4 depicts an example embodiment of a method for use by a controller for supporting control over association of WiFi clients with WiFi access points.

FIG. 4 depicts an example embodiment of a method for use by a controller for supporting control over association of WiFi clients with WiFi access points. It will be appreciated that, although primarily presented as being performed serially, at least a portion of the functions of method 400 may be performed contemporaneously or in a different order than as presented with respect to FIG. 4. At block 401, method 400 begins. At block 410, determine, by a controller for a wireless access point configured to support a first wireless band and a second wireless band, wireless access control information associated with the first wireless band of the wireless access point and configured to control association of wireless devices with the first wireless band of the wireless access point. At block 420, send, by the controller toward the wireless access point, the wireless access control information. At block 499, method 400 ends. The wireless access control information may include an access control list identifying a set of wireless devices to be blocked from associating with the first wireless band. The wireless access control information may be determined based on performance data received from the wireless access point. The performance data may include channel status information associated with one or more wireless devices associated with the wireless access point. The performance data may include radio band performance information associated with at least one of the first wireless band or the second wireless band. The wireless access control information may be determined based on device capability information for one or more wireless devices associated with the wireless access point. The controller may send, toward the wireless access point based on a congestion state of the second wireless band, an instruction for changing an activation state of the wireless access control information for the first wireless band on the wireless access point. The instruction may be configured to change the activation state of the access control information from being enabled to being disabled based on the congestion state of the second wireless band changing from an indication that the second wireless band is uncongested to an indication that the second wireless band is congested. The instruction may be configured to change the activation state of the access control information from being disabled to being enabled based on the congestion state of the second wireless band changing from an indication that the second wireless band is congested to an indication that the second wireless band is uncongested. The controller may monitor a signal strength level of a wireless device for the second radio band and modify, based on the signal strength level of the wireless device for the second radio band, the wireless access control information. The indication of the wireless device may be removed from the wireless access control information when the wireless device is associated with the second radio band and the signal strength level of the wireless device is less than or equal to a signal strength threshold. The indication of the wireless device may be added to the wireless access control information when the wireless device is associated with the second radio band and the signal strength level of the wireless device is greater than or equal to a signal strength threshold. The controller may maintain, for a wireless device identified in the wireless access control information, an inactivity timer, and send, toward the wireless access point based on the inactivity timer, a message including an indication that the wireless device is to be removed from the wireless access control information. The first wireless band may be at a lower frequency than the second wireless band. The first wireless band may be a 2.4 GHz band and the second wireless band may be a 5 GHz band or a 6 GHz band. It will be appreciated that various other example embodiments presented herein may be incorporated within the context of the method 400 of FIG. 4.

Figure 5:
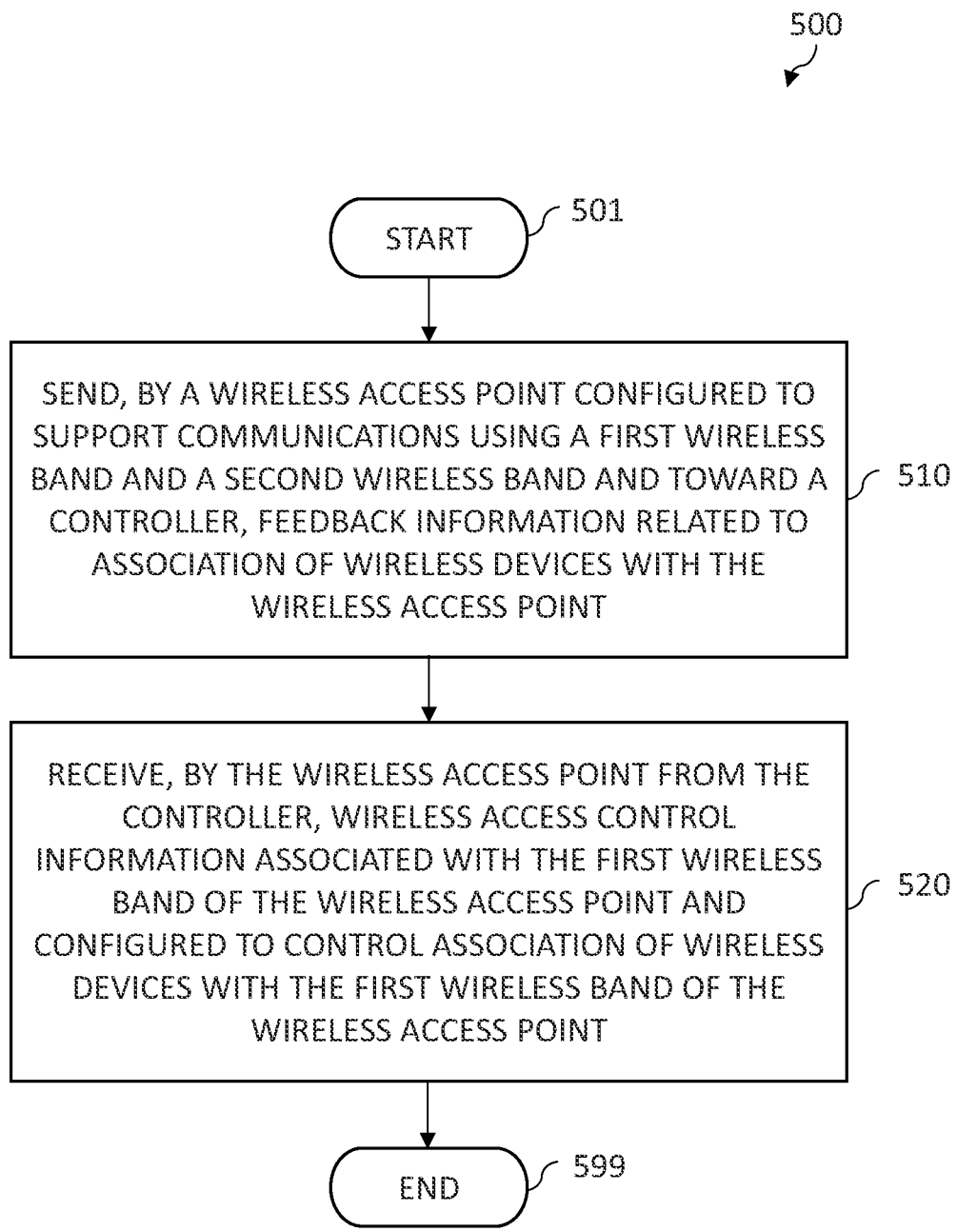
FIG. 5 depicts an example embodiment of a method for use by a WiFi access point for interacting with a controller for supporting control over association of a WiFi client with the WiFi access point.

FIG. 5 depicts an example embodiment of a method for use by a WiFi access point for interacting with a controller for supporting control over association of a WiFi client with the WiFi access point. It will be appreciated that, although primarily presented as being performed serially, at least a portion of the functions of method 500 may be performed contemporaneously or in a different order than as presented with respect to FIG. 5. At block 501, method 500 begins. At block 510, send, by a wireless access point configured to support communications using a first wireless band and a second wireless band and toward a controller, feedback information related to association of wireless devices with the wireless access point. At block 520, receive, by the wireless access point from the controller, wireless access control information associated with the first wireless band of the wireless access point and configured to control association of wireless devices with the first wireless band of the wireless access point. At block 599, method 500 ends. The feedback information may include performance data including channel status information for a wireless device associated with the wireless access point. The channel status information for the wireless device associated with the wireless access point may include received signal strength indicator data of the wireless device. The feedback information may include performance data including radio band performance information associated with at least one of the first wireless band or the second wireless band. The wireless access control information may include an access control list identifying a set of wireless devices to be blocked from associating with the first wireless band. The wireless access point may receive, from the controller, an indication that the wireless access control information is to be enabled at the wireless access point, and enable, based on the indication, the wireless access control information. The wireless access point may receive, from the controller, an indication that the wireless access control information is to be disabled at the wireless access point, and disable, based on the indication, the wireless access control information. The wireless access point may monitor a signal strength level of a wireless device for the second radio band and modify, based on the signal strength level of the wireless device for the second radio band, the wireless access control information. The indication of the wireless device may be removed from the wireless access control information when the wireless device is associated with the second radio band and the signal strength level of the wireless device is less than or equal to a signal strength threshold. The indication of the wireless device may be added to the wireless access control information when the wireless device is associated with the second radio band and the signal strength level of the wireless device is greater than or equal to a signal strength threshold. The wireless access point may maintain, for a wireless device identified in the wireless access control information, an inactivity timer, and update, based on the inactivity timer, the wireless access control information to remove an indication of the wireless device from the wireless access control information. The wireless access point may receive a request of a wireless device to communication using the first wireless band and prevent, based on the wireless access control information associated with the first wireless band, association of the wireless device with the first wireless band. The first wireless band is at a lower frequency than the second wireless band. The first wireless band may be a 2.4 GHz band and the second wireless band may be a 5 GHz band or a 6 GHz band. It will be appreciated that various other example embodiments presented herein may be incorporated within the context of the method 500 of FIG. 5.

Figure 6:
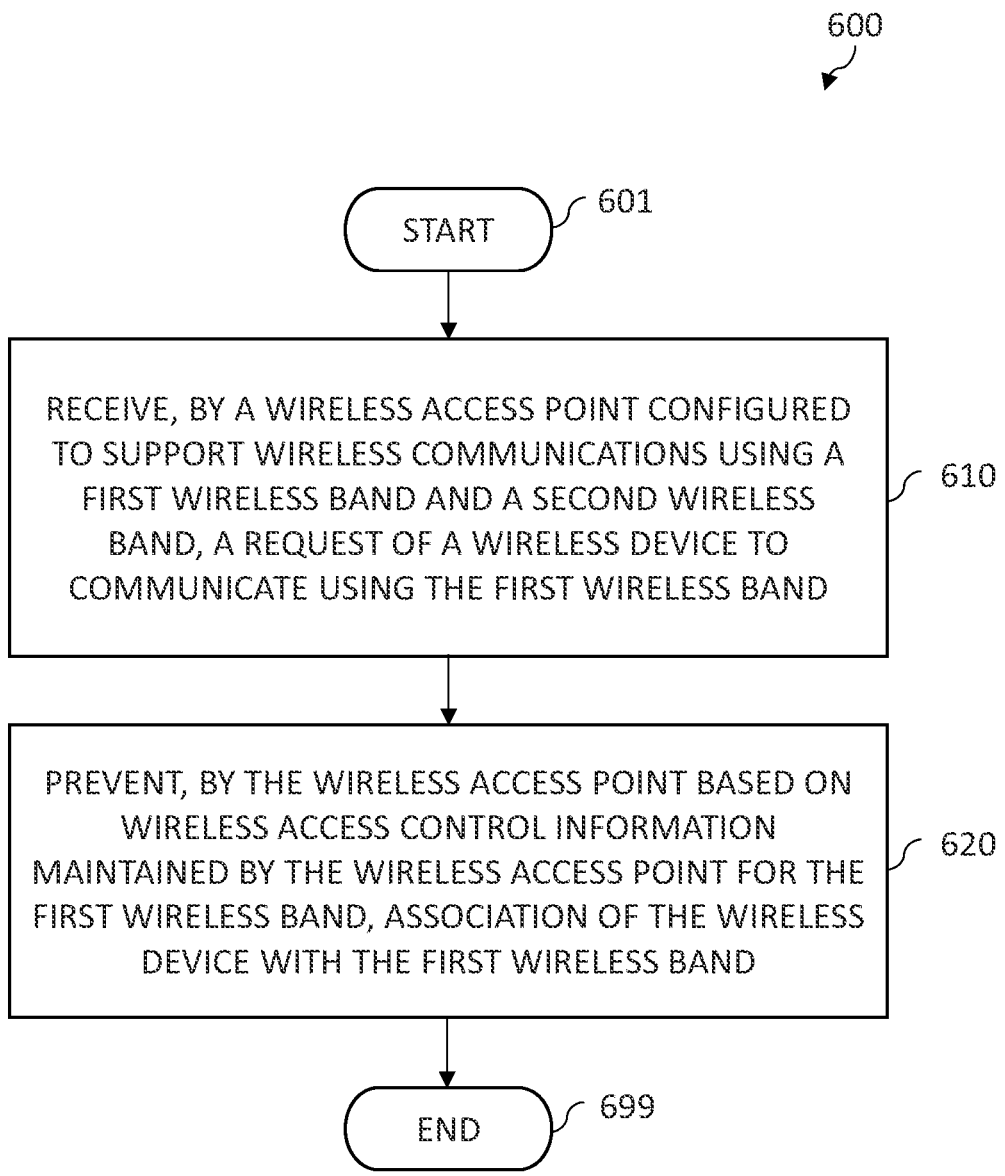
FIG. 6 depicts an example embodiment of a method for use by a WiFi access point for interacting with a WiFi client for supporting control over association of the WiFi client with the WiFi access point.

FIG. 6 depicts an example embodiment of a method for use by a WiFi access point for interacting with a WiFi client for supporting control over association of the WiFi client with the WiFi access point. It will be appreciated that, although primarily presented as being performed serially, at least a portion of the functions of method 600 may be performed contemporaneously or in a different order than as presented with respect to FIG. 6. At block 601, method 600 begins. At block 610, receive, by a wireless access point configured to support wireless communications using a first wireless band and a second wireless band, a request of a wireless device to communicate using the first wireless band. At block 620, prevent, by the wireless access point based on wireless access control information maintained by the wireless access point for the first wireless band, association of the wireless device with the first wireless band. At block 699, method 600 ends. The request of a wireless device to communicate using the first wireless band may include an authentication request of the wireless device or an association request of the wireless device. The wireless access control information may include an access control list, and the access control list may include an identifier of the wireless device. The association of the wireless device with the first wireless band may be prevented by blocking, by the wireless access point, authentication of the wireless device by the wireless access point. The association of the wireless device with the first wireless band may be prevented by the wireless access point, association of the wireless device with the wireless access point. The wireless access point may send, toward the wireless device, an indication that the request of the wireless device to communicate using the first wireless band has been denied. The request of the wireless device to communicate using the first wireless band may include an authentication request of the wireless device, and the indication that the request of the wireless device to communicate using the first wireless band has been denied may be included in an authentication response message sent toward the wireless device. The request of the wireless device to communicate using the first wireless band may include an association request of the wireless device, and the indication that the request of the wireless device to communicate using the first wireless band has been denied may be included in an association response message sent toward the wireless device. The indication that the request of the wireless device to communicate using the first wireless band has been denied may be provided using a status code included in the association response message sent toward the wireless device. The wireless access point may receive from the wireless device, a request of the wireless device to communicate using the second wireless band and, further, the wireless access point may permit association of the wireless device with the second wireless band. The first wireless band may be at a lower frequency than the second wireless band. The first wireless band may include a 2.4 GHz band and the second wireless band may include a 5 GHz band or a 6 GHz band. It will be appreciated that various other example embodiments presented herein may be incorporated within the context of the method 600 of FIG. 6.

Figure 7:
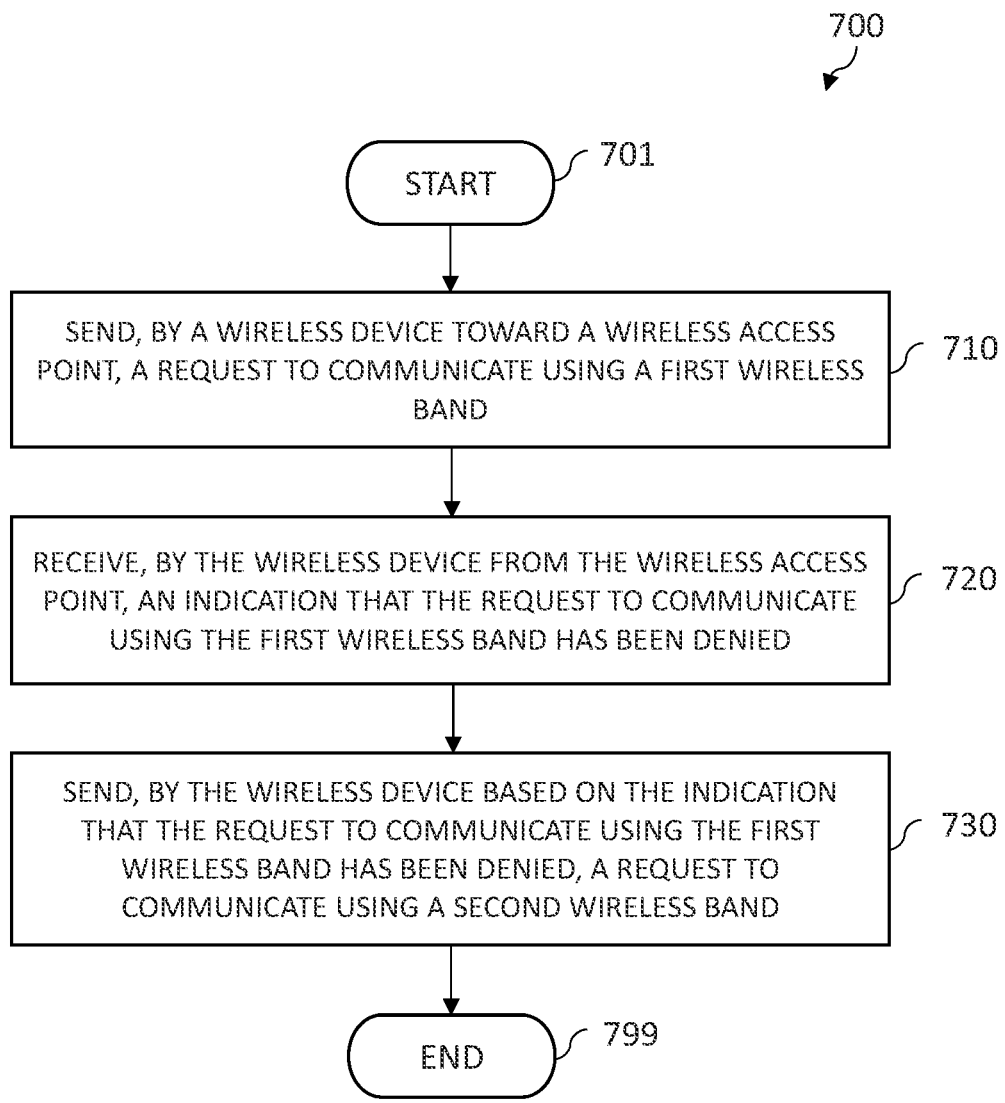
FIG. 7 depicts an example embodiment of a method for use by a WiFi client for interacting with a WiFi access point configured to control association of WiFi clients with the WiFi access point.

FIG. 7 depicts an example embodiment of a method for use by a WiFi client for interacting with a WiFi access point configured to control association of WiFi clients with the WiFi access point. It will be appreciated that, although primarily presented as being performed serially, at least a portion of the functions of method 700 may be performed contemporaneously or in a different order than as presented with respect to FIG. 7. At block 701, method 700 begins. At block 710, send, by a wireless device toward a wireless access point, a request to communicate using a first wireless band. At block 720, receive, by the wireless device from the wireless access point, an indication that the request to communicate using the first wireless band has been denied. At block 730, send, by the wireless device based on the indication that the request to communicate using the first wireless band has been denied, a request to communicate using a second wireless band. At block 799, method 700 ends. The request to communicate using the first wireless band may include an authentication request of the wireless device or an association request of the wireless device. The request to communicate using the first wireless band may include an authentication request of the wireless device, and the indication that the request to communicate using the first wireless band has been denied may be received in an authentication response message. The request to communicate using the first wireless band may include an association request of the wireless device, and the indication that the request to communicate using the first wireless band has been denied may be received in an association response message. The indication that the request to communicate using the first wireless band has been denied may be indicated using a status code included in the association response message. The request to communicate using the second wireless band may be sent toward the wireless access point. The request to communicate using the second wireless band may be sent toward a second wireless access point. The first wireless band may be at a lower frequency than the second wireless band. The first wireless band may include a 2.4 GHz band and the second wireless band may include a 5 GHz band or a 6 GHz band. It will be appreciated that various other example embodiments presented herein may be incorporated within the context of the method 700 of FIG. 7.

Various example embodiments for supporting control over association of WiFi clients with WiFi APs may provide various advantages or potential advantages. For example, various example embodiments for supporting control over association of WiFi clients with WiFi APs may be configured to control allocation of radio resources to massive numbers of WiFi APs while improving or even optimizing the WiFi network performance of the associated WiFi clients. For example, various example embodiments for supporting control over association of WiFi clients with WiFi APs may be configured to enable WiFi networks to force WiFi clients to associate with particular WiFi APs or radio bands of WiFi APs without requiring use of commands from the WiFi APs to the WiFi clients, thereby supporting control over association of WiFi clients with WiFi APs while still enabling the WiFi clients to autonomously select WiFi APs with which to associate. For example, various example embodiments for supporting control over association of WiFi clients with WiFi APs may be configured to prevent WiFi clients from associating with radio bands of WiFi APs and staying of those radio bands of WiFi APs for extended periods of time even if the WiFi clients are experiencing sub-optimal or even poor performance while other radio bands of WiFi APs in the vicinity are available to provide better throughput to the WiFi clients due to better link quality and/or lower congestion levels (e.g., some WiFi clients have a tendency to associate to the 2.4 GHz radio band that has smaller bandwidth and a lower Modulation and Coding Scheme (MCS) even though one or more 5 GHz radio bands may be available in the vicinity). For example, various example embodiments for supporting control over association of WiFi clients with WiFi APs may be configured to support control over access by WiFi clients to WiFi radio bands without systematically blocking a given WiFi radio band (since not all WiFi client support multiple WiFi radio bands and, thus, systematic blocking of a given WiFi radio band may block the only means by which those single-band WiFi clients can obtain network access). It will be appreciated that various example embodiments for supporting control over association of WiFi clients with WiFi APs may provide various other advantages or potential advantages.

Figure 8:
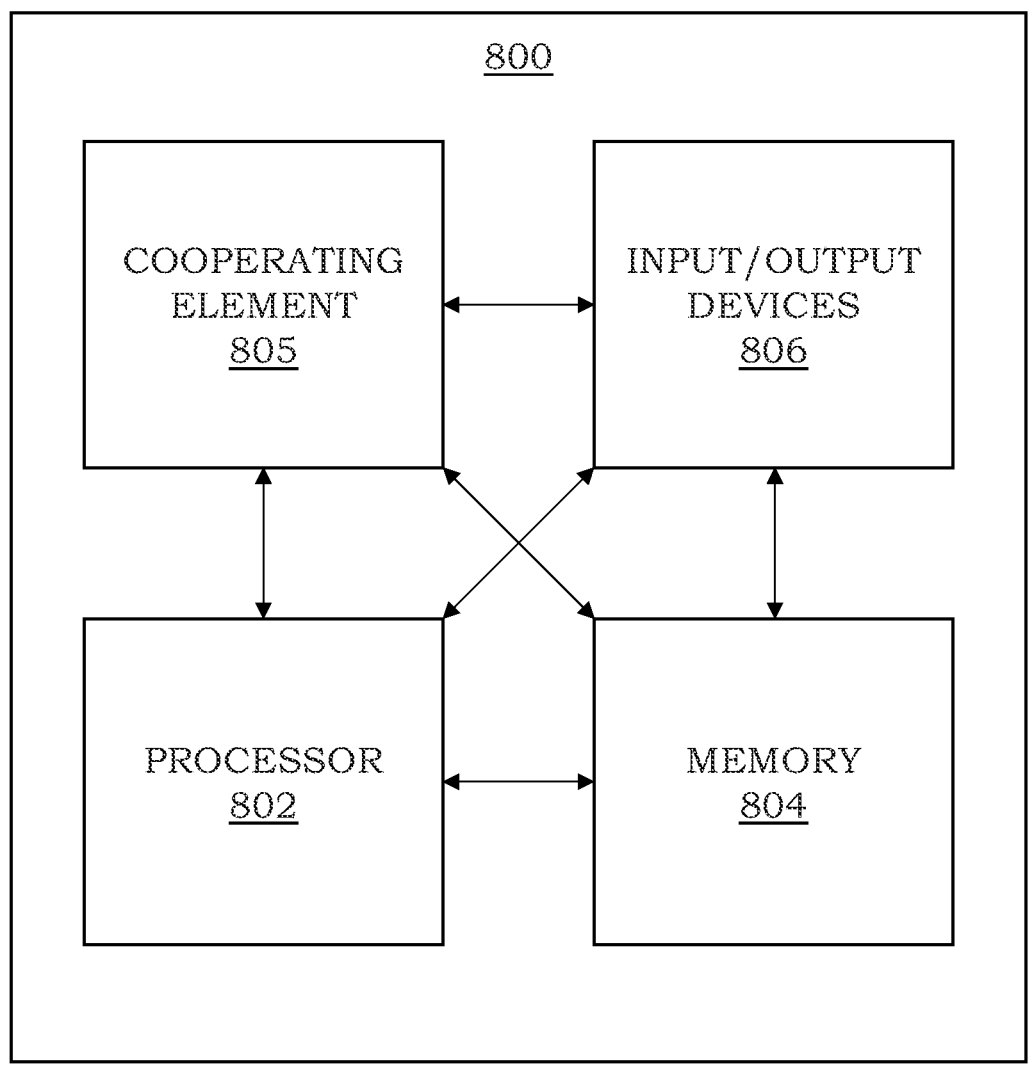
FIG. 8 depicts an example embodiment of a computer suitable for use in performing various functions presented herein.

FIG. 8 depicts an example embodiment of a computer suitable for use in performing various functions presented herein.

The computer 800 includes a processor 802 (e.g., a central processing unit (CPU), a processor, a processor having a set of processor cores, a processor core of a processor, or the like) and a memory 804 (e.g., a random access memory, a read only memory, or the like). The processor 802 and the memory 804 may be communicatively connected. In at least some example embodiments, the computer 800 may include at least one processor and at least one memory including computer program code, wherein the at least one memory and the computer program code are configured, with the at least one processor, to cause the computer to perform various functions presented herein.

The computer 800 also may include a cooperating element 805. The cooperating element 1005 may be a hardware device. The cooperating element 805 may be a process that can be loaded into the memory 804 and executed by the processor 802 to implement various functions presented herein (in which case, for example, the cooperating element 805 (including associated data structures) can be stored on a non-transitory computer-readable storage medium, such as a storage device or other suitable type of storage element (e.g., a magnetic drive, an optical drive, or the like)).

The computer 800 also may include one or more input/output devices 806. The input/output devices 806 may include one or more of a user input device (e.g., a keyboard, a keypad, a mouse, a microphone, a camera, or the like), a user output device (e.g., a display, a speaker, or the like), one or more network communication devices or elements (e.g., an input port, an output port, a receiver, a transmitter, a transceiver, or the like), one or more storage devices (e.g., a tape drive, a floppy drive, a hard disk drive, a compact disk drive, or the like), or the like, as well as various combinations thereof.

It will be appreciated that computer 800 may represent a general architecture and functionality suitable for implementing functional elements described herein, portions of functional elements presented herein, combinations of functional elements presented herein, or the like, as well as various combinations thereof. For example, computer 800 may provide a general architecture and functionality that is suitable for implementing one or more devices presented herein, such as a controller or a portion thereof, a WiFi access point or a portion thereof, a WiFi client or a portion thereof, or the like, as well as various combinations thereof.

It will be appreciated that at least some of the functions presented herein may be implemented in software (e.g., via implementation of software on one or more processors, for executing on a general purpose computer (e.g., via execution by one or more processors) so as to provide a special purpose computer, and the like) and/or may be implemented in hardware (e.g., using a general purpose computer, one or more application specific integrated circuits, and/or any other hardware equivalents).

It will be appreciated that at least some of the functions presented herein may be implemented within hardware, for example, as circuitry that cooperates with the processor to perform various functions. Portions of the functions/elements described herein may be implemented as a computer program product wherein computer instructions, when processed by a computer, adapt the operation of the computer such that the methods and/or techniques described herein are invoked or otherwise provided. Instructions for invoking the various methods may be stored in fixed or removable media (e.g., non-transitory computer-readable media), transmitted via a data stream in a broadcast or other signal bearing medium, and/or stored within a memory within a computing device operating according to the instructions.

It will be appreciated that the term "or" as used herein refers to a non-exclusive "or" unless otherwise indicated (e.g., use of "or else" or "or in the alternative").

It will be appreciated that, although various embodiments which incorporate the teachings presented herein have been shown and described in detail herein, those skilled in the art can readily devise many other varied embodiments that still incorporate these teachings.

What is claimed is:

1. An apparatus, comprising:
   at least one processor; and
   at least one memory including instructions which, when executed by the at least one processor, cause the apparatus to at least:
      send, by a wireless access point configured to support communications using a first wireless band and a second wireless band and toward a controller, feedback information related to association of wireless devices with the wireless access point, wherein the feedback information includes performance data; and
      receive, by the wireless access point from the controller, wireless access control information associated with the first wireless band of the wireless access point and configured to control association of wireless devices with the first wireless band of the wireless access point, wherein the wireless access control information includes an access control list identifying a set of wireless devices to be blocked by the wireless access point from associating with the first wireless band and forced to associated with the second wireless band, wherein the wireless access control information is determined based on at least one of the performance data or device capability information for one or more wireless devices associated with the wireless access point.

2. The apparatus of claim 1, wherein the performance data includes channel status information for a wireless device associated with the wireless access point.

3. The apparatus of claim 2, wherein the channel status information for the wireless device associated with the wireless access point includes received signal strength indicator data of the wireless device associated with the wireless access point.

4. The apparatus of claim 1, wherein the performance data includes wireless band performance information associated with at least one of the first wireless band or the second wireless band.

5. The apparatus of claim 1, wherein the wireless access control information is determined based on the performance data and the device capability information for one or more wireless devices associated with the wireless access point.

6. The apparatus of claim 1, wherein the instructions, when executed by the at least one processor, cause the apparatus to at least:
   receive, by the wireless access point from the controller, an indication that the wireless access control information is to be enabled at the wireless access point; and
   enable, by the wireless access point based on the indication, the wireless access control information.

7. The apparatus of claim 1, wherein the instructions, when executed by the at least one processor, cause the apparatus to at least:
   receive, by the wireless access point from the controller, an indication that the wireless access control information is to be disabled at the wireless access point; and
   disable, by the wireless access point based on the indication, the wireless access control information.

8. The apparatus of claim 1, wherein the instructions, when executed by the at least one processor, cause the apparatus to at least:
   receive, by the wireless access point, a request of a wireless device to communicate using the first wireless band; and
   prevent, by the wireless access point based on the wireless access control information associated with the first wireless band, association of the wireless device with the first wireless band.

9. The apparatus of claim 1, wherein the first wireless band is at a lower frequency than the second wireless band.

10. The apparatus of claim 9, wherein the first wireless band comprises a 2.4 GHz band and the second wireless band comprises a 5 GHz band or a 6 GHz band.

11. An apparatus, comprising:
    at least one processor; and
    at least one memory including instructions which, when executed by the at least one processor, cause the apparatus at least to:
       send, by a wireless access point configured to support communications using a first wireless band and a second wireless band and toward a controller, feedback information related to association of wireless devices with the wireless access point;
       receive, by the wireless access point from the controller, wireless access control information associated with the first wireless band of the wireless access point and configured to control association of wireless devices with the first wireless band of the wireless access point;
       monitor, by the wireless access point, a signal strength level of a wireless device for the second wireless band; and
       modify, by the wireless access point based on the signal strength level of the wireless device for the second wireless band, the wireless access control information.

12. The apparatus of claim 11, wherein an indication of the wireless device is removed from the wireless access control information when the wireless device is associated with the second wireless band and the signal strength level of the wireless device is less than or equal to a signal strength threshold.

13. The apparatus of claim 11, wherein an indication of the wireless device is added to the wireless access control information when the wireless device is associated with the second wireless band and the signal strength level of the wireless device is greater than or equal to a signal strength threshold.

14. An apparatus, comprising:
   at least one processor; and
   at least one memory including instructions which, when executed by the at least one processor, cause the apparatus at least to:
      send, by a wireless access point configured to support communications using a first wireless band and a second wireless band and toward a controller, feedback information related to association of wireless devices with the wireless access point;
      receive, by the wireless access point from the controller, wireless access control information associated with the first wireless band of the wireless access point and configured to control association of wireless devices with the first wireless band of the wireless access point;
      maintain, by the wireless access point for a wireless device identified in the wireless access control information, an inactivity timer; and
      update, by the wireless access point based on the inactivity timer, the wireless access control information to remove an indication of the wireless device from the wireless access control information.

15. An apparatus, comprising:
   at least one processor; and
   at least one memory including instructions which, when executed by the at least one processor, cause the apparatus to at least:
      receive, by a controller from a wireless access point configured to support communications using a first wireless band and a second wireless band, feedback information related to association of wireless devices with the wireless access point, the feedback information including performance data;
      determine, by the controller for the wireless access point, wireless access control information associated with the first wireless band of the wireless access point and configured to control association of wireless devices with the first wireless band of the wireless access point, wherein the wireless access control information includes an access control list identifying a set of wireless devices to be blocked by the wireless access point from associating with the first wireless band and forced to associated with the second wireless band, wherein the wireless access control information is determined based on at least one of the performance data or device capability information for one or more wireless devices associated with the wireless access point; and
      send, by the controller toward the wireless access point, the wireless access control information.

16. The apparatus of claim 15, wherein the performance data includes channel status information for a wireless device associated with the wireless access point.

17. The apparatus of claim 15, wherein the performance data includes wireless band performance information associated with at least one of the first wireless band or the second wireless band.

18. The apparatus of claim 15, wherein the wireless access control information is determined based on the performance data and based on the device capability information for one or more wireless devices associated with the wireless access point.

19. The apparatus of claim 15, wherein the first wireless band is at a lower frequency than the second wireless band.

20. An apparatus, comprising:
   at least one processor; and
   at least one memory including instructions which, when executed by the at least one processor, cause the apparatus at least to:
      determine, by a controller for a wireless access point configured to support a first wireless band and a second wireless band, wireless access control information associated with the first wireless band of the wireless access point and configured to control association of wireless devices with the first wireless band of the wireless access point;
      send, by the controller toward the wireless access point, the wireless access control information; and
      send, by the controller toward the wireless access point based on a congestion state of the second wireless band, an instruction for changing an activation state of the wireless access control information for the first wireless band on the wireless access point.

21. An apparatus, comprising:
   at least one processor; and
   at least one memory including instructions which, when executed by the at least one processor, cause the apparatus at least to:
      determine, by a controller for a wireless access point configured to support a first wireless band and a second wireless band, wireless access control information associated with the first wireless band of the wireless access point and configured to control association of wireless devices with the first wireless band of the wireless access point;
      send, by the controller toward the wireless access point, the wireless access control information;
      monitor, by the controller, a signal strength level of a wireless device for the second wireless band; and
      modify, by the controller based on the signal strength level of the wireless device for the second wireless band, the wireless access control information.

22. An apparatus, comprising:
   at least one processor; and
   at least one memory including instructions which, when executed by the at least one processor, cause the apparatus at least to:
      determine, by a controller for a wireless access point configured to support a first wireless band and a second wireless band, wireless access control information associated with the first wireless band of the wireless access point and configured to control association of wireless devices with the first wireless band of the wireless access point;
      send, by the controller toward the wireless access point, the wireless access control information;
      maintain, by the controller for a wireless device identified in the wireless access control information, an inactivity timer; and send, by the controller toward the wireless access point based on the inactivity timer, a message including an indication that the wireless device is to be removed from the wireless access control information.

\* \* \* \* \*

UNITED STATES PATENT AND TRADEMARK OFFICE
CERTIFICATE OF CORRECTION

| | |
|---|---|
| PATENT NO. | : 12,075,414 B2 |
| APPLICATION NO. | : 17/563463 |
| DATED | : August 27, 2024 |
| INVENTOR(S) | : Jean-Louis Gauvreau et al. |

It is certified that error appears in the above-identified patent and that said Letters Patent is hereby corrected as shown below:

In the Claims

In Column 33, Line 57, Claim 1, delete "to associated" and insert -- to associate --.
In Column 35, Line 56, Claim 15, delete "to associated" and insert -- to associate --.

Signed and Sealed this
Tenth Day of December, 2024

Katherine Kelly Vidal
*Director of the United States Patent and Trademark Office*